United States Patent
Chan et al.

(10) Patent No.: US 12,530,112 B2
(45) Date of Patent: Jan. 20, 2026

(54) GENERATING VIRTUAL SPACE HEADERS UTILIZING MACHINE-LEARNED MODELS

(71) Applicant: Salesforce, Inc., San Francisco, CA (US)

(72) Inventors: Melissa Aubrie Chan, San Francisco, CA (US); James Barnes, San Francisco, CA (US); Maya Aditi Holikatti, San Francisco, CA (US); Rohan Kumar Reddy Venapusala Alavalapati, Roseville, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/429,312

(22) Filed: Jan. 31, 2024

(65) Prior Publication Data

US 2025/0088479 A1 Mar. 13, 2025

Related U.S. Application Data

(60) Provisional application No. 63/537,758, filed on Sep. 11, 2023.

(51) Int. Cl.
*G06F 3/04842* (2022.01)
*G06F 40/166* (2020.01)
(Continued)

(52) U.S. Cl.
CPC ........ *G06F 3/04842* (2013.01); *G06F 40/166* (2020.01); *G06F 40/40* (2020.01);
(Continued)

(58) Field of Classification Search
CPC ......... H04L 51/02; H04L 51/48; H04L 51/52; H04L 67/306; G06F 3/04842;
(Continued)

(56) References Cited

U.S. PATENT DOCUMENTS

| 10,388,272 B1 | 8/2019 | Thomson et al. |
| 10,573,312 B1 | 2/2020 | Thomson et al. |

(Continued)

OTHER PUBLICATIONS

David Auberbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM).

(Continued)

*Primary Examiner* — Benjamin M Thieu
(74) *Attorney, Agent, or Firm* — Lee & Hayes, P.C.

(57) ABSTRACT

Techniques for updating and/or maintaining a header of a virtual space are described herein. A communication platform may receive a request from a user profile associated with a virtual space. The request may include instructions for the communication platform perform various header updating operations. In some examples, upon receiving the request, the communication platform may identify the data (e.g., virtual space data (e.g., administrative data, user posts and/or responses, files, etc.), user data, etc.) on which to perform the header updating operation. Based on identifying the data, the communication platform may input such data to one or more machine-learning models trained to output the data consistent with the requested operation. In some examples, the communication platform may receive the data from the machine-learning model and cause the data to be displayed to the associating header of the canvas.

20 Claims, 11 Drawing Sheets

(51) Int. Cl.
  *G06F 40/40* (2020.01)
  *G06N 20/00* (2019.01)
  *G06T 19/00* (2011.01)
  *H04L 51/02* (2022.01)
  *H04L 51/48* (2022.01)
  *H04L 51/52* (2022.01)
  *H04L 67/306* (2022.01)

(52) U.S. Cl.
  CPC ............. *G06N 20/00* (2019.01); *G06T 19/00* (2013.01); *H04L 51/02* (2013.01); *H04L 51/48* (2022.05); *H04L 51/52* (2022.05); *H04L 67/306* (2013.01)

(58) Field of Classification Search
  CPC ........ G06F 40/166; G06F 40/40; G06F 40/30; G06N 20/00; G06T 19/00
  See application file for complete search history.

(56) References Cited

U.S. PATENT DOCUMENTS

| | | | |
|---|---|---|---|
| 11,665,284 | B2 | 5/2023 | Jorasch et al. |
| 11,977,854 | B2 | 5/2024 | Tunstall-Pedoe et al. |
| 11,995,803 | B1 | 5/2024 | Karpman et al. |
| 2014/0080428 | A1 | 3/2014 | Rhoads et al. |
| 2018/0287982 | A1 | 10/2018 | Draeger et al. |
| 2019/0138904 | A1 | 5/2019 | Millius et al. |
| 2019/0272325 | A1 | 9/2019 | Korn |
| 2020/0089812 | A1* | 3/2020 | Kline ............... G06F 16/58 |
| 2021/0192134 | A1 | 6/2021 | Yue et al. |
| 2021/0255744 | A1* | 8/2021 | Sullivan ............. G06F 3/0482 |
| 2022/0093088 | A1 | 3/2022 | Rangarajan Sridhar et al. |
| 2022/0122587 | A1 | 4/2022 | Thomson et al. |
| 2022/0167108 | A1 | 5/2022 | Laaksonen et al. |
| 2022/0180060 | A1 | 6/2022 | Jain et al. |
| 2022/0368660 | A1* | 11/2022 | Niess ............... H04L 12/1818 |
| 2023/0020886 | A1 | 1/2023 | Mahapatra et al. |
| 2023/0176829 | A1 | 6/2023 | Rahmani et al. |
| 2023/0185957 | A1* | 6/2023 | Brown ............... G06F 21/6245 726/26 |
| 2023/0259705 | A1 | 8/2023 | Tunstall-Pedoe et al. |
| 2023/0274086 | A1 | 8/2023 | Tunstall-Pedoe et al. |
| 2023/0274094 | A1 | 8/2023 | Tunstall-Pedoe et al. |
| 2024/0039905 | A1* | 2/2024 | Talavera ............. G06F 16/248 |
| 2024/0079102 | A1 | 3/2024 | Goravar et al. |
| 2024/0104467 | A1 | 3/2024 | Guha et al. |
| 2024/0220717 | A1 | 7/2024 | Nagargoje |
| 2024/0273286 | A1 | 8/2024 | Maria et al. |
| 2024/0412003 | A1 | 12/2024 | Heller et al. |
| 2025/0007870 | A1 | 1/2025 | Myung et al. |
| 2025/0045516 | A1 | 2/2025 | Reyna Fernandez et al. |
| 2025/0061290 | A1 | 2/2025 | Gardner et al. |
| 2025/0077844 | A1 | 3/2025 | Lin et al. |
| 2025/0085836 | A1 | 3/2025 | Chan |
| 2025/0086404 | A1 | 3/2025 | Fong |
| 2025/0086546 | A1 | 3/2025 | Chan |
| 2025/0086895 | A1 | 3/2025 | Chan |

OTHER PUBLICATIONS

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.

"Die, Email, Die! A Flickr Cofounder Aims To Cut US All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 3 pages.

Robert Hof, "Stewart Butterfield On How Slack Became A $2.8 Billion Unicorn", FORBES, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 3 pages.

Internet Relay Chat, WIKIPEDIA, [online][retrieved May 30, 2019]. Retrieved from the Internet: <URL: https://en. wikipedia.org/wiki/Internet_Relay_Chat>. (dated May 28, 2019) 21 pages.

Mike Issac, "Slack, a Start-Up With an App to Foster Business Collaboration, Is Valued at $1.1 Billion", The New York Times Blogs (Bits), Lexisnexis, https://advance.lexis.com/api/permalink/3eb84b34-a8f9-4d7d-9573-89d9598a4963/?context=1000516>. (dated Oct. 31, 2014) 3 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.

Matsumoto, T. et al., "Chocoa Communicator - A New Communication System Based on Awareness and Text Communications", FUJITSU Sci. Tech. J., 36, 2, (Dec. 2000) pp. 154-161.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Ernie Smith, "Picking Up The Slack", TEDIUM, [online][retrieved May 9, 2019]. Retrieved from the Internet: <URL: https://tedium.co/2017/10/17/irc-vs-slack-chat-history/>. (dated Oct. 17, 2017) 13 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.

Jonathan Vanian, "Why these startups think chat apps are the next big thing in workplace collaboration", GIGAOM, Lexisnexis, https://advance.lexis.com/api/permalink/e83778c8-09c8-43aa-9ba0-88526283de69/?context=1000516, (dated Aug. 1, 2014, 5:45 PM) 5 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 3 pages.

Chiang CH, Lee HY. Can large language models be an alternative to human evaluations ?. arXiv preprint arXiv:2305.01937, May 3, 2023. 23 pages.

Lee, M., Liang, P., & Yang, Q., Coauthor: Designing a human-ai collaborative writing dataset for exploring language model capabilities. In Proceedings of the 2022 CHI conference on human factors in computing systems, pp. 1-19.

Office Action for U.S. Appl. No. 18/429,289, Dated Aug. 12, 2025, 18 pages.

* cited by examiner

FIG. 2B

GENERATING VIRTUAL SPACE HEADERS UTILIZING MACHINE-LEARNED MODELS

RELATED APPLICATIONS

This application claims the benefit of priority to U.S. Patent Application 63/537,758, filed Sep. 11, 2023, which is incorporated herein by reference in its entirety.

TECHNICAL FIELD

Communication platforms are becoming increasingly more popular for organizations to facilitate work related communications. Users of such communication platforms can communicate with other users via channels, direct messages, and/or other virtual spaces. In some examples, channels (or any other virtual space) may include a canvas that provides a means for curating, organizing, and sharing collections of information between users. In such instances, various members of the channel may be tasked with manually inputting and/or maintaining the content found on the canvas. Accordingly, such manual tasks may result in inaccurate data, delays in updating such data, and inefficient use of user time.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different figures indicates similar or identical components or features. The figures are not drawn to scale.

FIG. 2B illustrates a user interface for multimedia collaboration sessions within the group-based communication system for certain examples.

DETAILED DESCRIPTION

Figure 1:
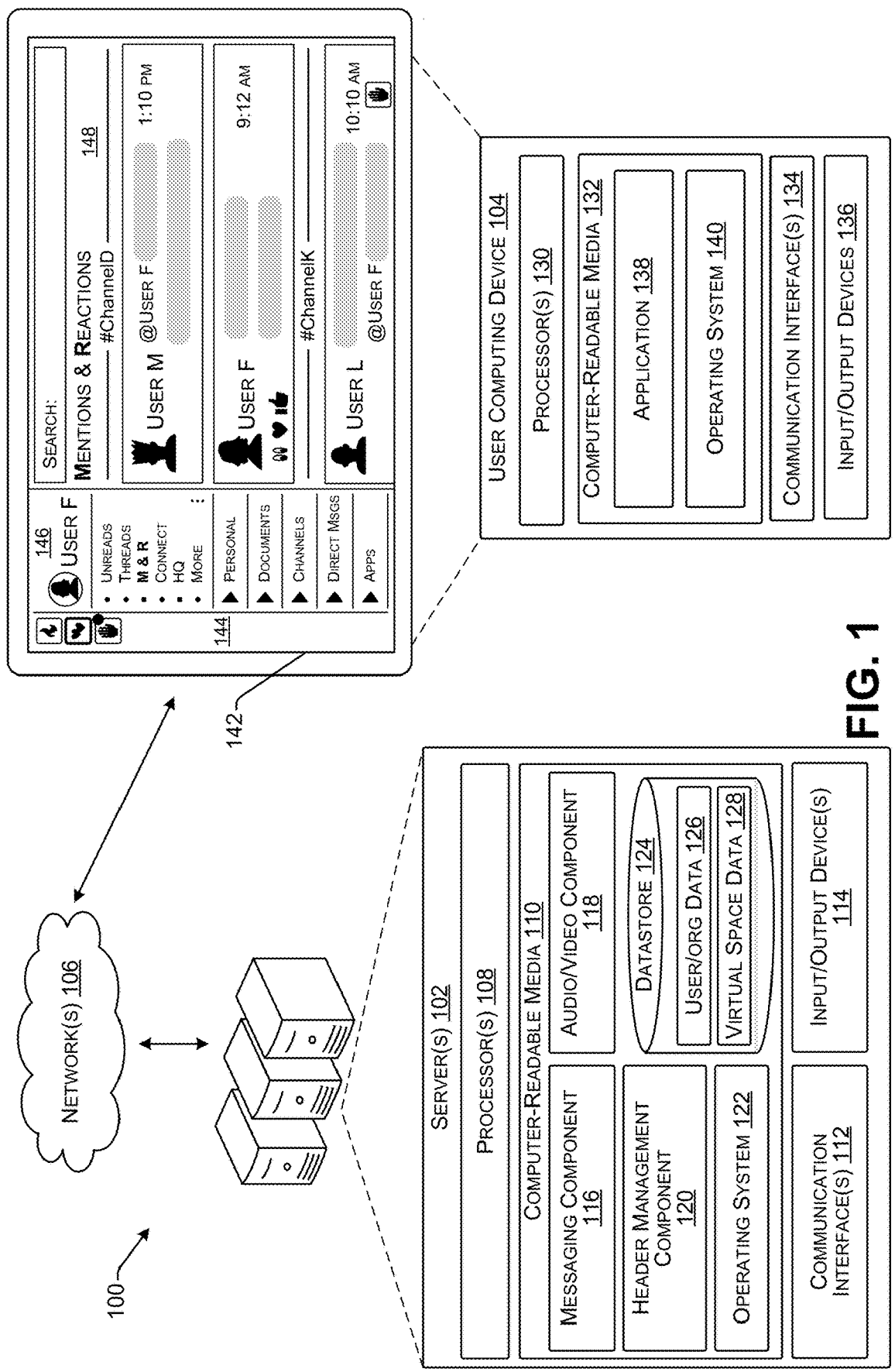
FIG. 1 illustrates an example system for performing techniques described herein.

Techniques for updating and/or maintaining a header of a virtual space are described herein. As described below, machine-learning model(s) may be used to determine, update, modify and/or synthesize various types of data within a virtual space. In some examples, a communication platform may receive a request from a user profile associated with a virtual space. In such instances, the request may include one or more instructions for the communication platform to perform various header updating operations. Such header updating operations may include summarizing the content associated with a virtual space, identifying one or more user profiles that are sufficiently active (e.g., number of posts and/or interactions with the virtual space meet or exceed a threshold value) in the virtual space, identifying one or more documents that are relevant (e.g., accessed, shared, or created within a threshold period of time, accessed and/or revised a threshold number of times, etc.) to the virtual space, converting a manual header (e.g., created and/or updated manually) of a canvas to a learned header updated based on a machine-learning model. In some examples, upon receiving the request, the communication platform may identify the data (e.g., virtual space data (e.g., administrative data, user posts and/or responses, files, etc.), user data, etc.) on which to perform the header updating operation. Based on identifying the data, the communication platform may input such data to one or more machine-learning models trained to output the data consistent with the requested operation. In some examples, the communication platform may receive the data from the machine-learning model and cause the data to be displayed to the associating header of the canvas. As discussed throughout this disclosure, the techniques may improve the user experience by maintaining headers of a virtual space updated. In addition, such techniques can reduce the user of the computing resources by reducing the time and steps by users to identify relevant data within the virtual space, analyzing such data, and/or using such data to update the headers of the virtual space.

When updating a header of a virtual space, conventional techniques may be inefficient, ineffective, disruptive to the user experience, and/or lead to suboptimal results. For example, a user profile may be a member of virtual spaces (e.g., channel(s), thread(s), board(s), direct messaging instance(s), multiparty instance(s), etc.). Such virtual spaces may include a canvas virtual space (or section) configured to provide a means for curating, organizing, and/or sharing collections of information between user profiles associated with the virtual space. That is, a canvas may include important and/or relevant information for the user profiles that are members of the virtual space. In some cases, when creating a canvas, one or more user profiles may add data specific to the virtual space. However, once the canvas has been created, the user profiles of the virtual space may be responsible for keeping the canvas up to date. To update the canvas, user profiles may be required to spend excessive amounts of time manually analyzing some or all data associated with the virtual space. Overall, the inefficiencies described above creates wasted time as users are required to manually analyze vast numbers of documents, files, messages, video/voice calls, etc. to identify data that is to be included in the canvas. As such, conventional systems may be insufficient and may cause users to lose excessive amounts of time manually analyzing virtual space data. Consequently, the vast amount of manual review of the canvases and the manual changes themselves may cause increased use of computing resources, processing power, etc., which may increase latency associated with the communication platform.

To address these and other technical problems and inefficiencies, the systems and/or techniques described herein may include a header management component (which also may be referred to as a "header manager" or a "header management system") configured to update content within a header using one or more machine-learning models. The technical solutions discussed herein solve one or more technical problems associated with conventional header updating techniques resulting in a suboptimal and/or inadequate user experience.

Initially, the communication platform may receive a request from a user profile associated with a virtual space. In some examples, the communication platform can be a group-based communication platform, a channel-based messaging platform, a sales-based platform, and/or any other platform for facilitating communication between and among users. Users can use a variety of devices (or "user devices") to access the communication platform. Such devices may include any suitable type of computing device, e.g., portable, semi-portable, semi-stationary, or stationary. Some examples of a user device can include a tablet computing device, a smart phone, a mobile communication device, a laptop, a netbook, a desktop computing device, a terminal computing device, a wearable computing device, an augmented reality device, an Internet of Things (IoT) device, or any other computing device capable of sending communications and performing the functions according to the techniques described herein.

In some examples, the communication platform may receive a request instructing the communication platform to perform an operation. A request may include one or more instructions for the communication platform to perform a header modifying, updating, and/or generating operation on data (or content) stored or otherwise displayed within a virtual space. That is, the request may include instruction(s) to modify content stored or otherwise displayed within a canvas. A canvas may be associated with a separate virtual space (e.g., channel, direct messaging instance, board, etc.) and may be a location in which data of the virtual space may be organized and/or curated for members of the virtual space. For instance, a virtual space may be a channel and the channel may include a canvas section (or virtual space) configured to organize and present important information to members of the channel.

In some examples, the user profiles may send the request by interacting with one or more actionable user interface elements within the canvas. The canvas may include one or more headers that may be configured to organize data within the canvas. A header may be a virtual space located within the canvas; however, this is not intended to be limiting, in other examples the header may be located within the channel and/or any other location. Such headers may include a summary header configured to summarize the purpose of the virtual space and/or summarize the recent events within the virtual space, a people header configured to identify user profiles that are sufficiently active within the virtual space, a document header configured to identify one or more documents or files that may be relevant or important to the virtual space, a policies header configured to display current policies associated with the members of the virtual space, etc. However, this is not intended to be limiting; in other examples, the canvas may include more or fewer headers configured to present information about the same or different topics. In some examples, the headers may include one or more actionable user interface elements enabling a user profile to request one or more header updating operations. For example, the user interface elements may include options to update one or more of the headers. As such, the user profile may select a specific header and instruct the communication platform to update the data stored or otherwise displayed therein.

In some examples, the communication platform may identify the header modifying operation based on the request. Some or all headers of the canvas may include a unique modification operation. For example, such header modifying operations may include summarizing the content associated with a virtual space, identifying one or more user profiles that are sufficiently active (e.g., number of posts and/or interactions with the virtual space meet or exceed a threshold value, number of posts within a threshold period of time satisfies a threshold, etc.) in the virtual space, identifying one or more documents that are relevant (e.g., accessed, shared, or created within a threshold period of time, accessed and/or revised a threshold number of times, etc.) to the virtual space, converting a manual header (e.g., created and/or updated manually) of a canvas to a learned header updated based on a machine-learning model. However, this is not intended to be limiting; in other examples, the header modifying operations may include more or fewer operations configured to perform the same or different header modifying operations. As such, when receiving the request to modify the content within a header, the request may indicate which header to modify. In such instances, each header may be associated with a specific header updating operation. As such, based on identifying the header to modify, the communication platform may identify the modifying operation associated with the header. For example, a user profile may send a request to the communication platform to modify the summary header. As such, the request may include an instruction to modify the summary header. Further, the communication platform may determine that the summary header may be associated with a summarizing operation. However, this is not intended to be limiting; in other examples, the request may also include the modifying operation to perform on the header.

In some examples, upon receiving the request, the communication platform may identify data on which to perform the header modifying operation. Data may include message data, reaction data, file data, document data, administrative data, user data, email data, meeting data, and/or any other type of data that may be relevant to the header to modify. As such, the communication platform may identify the content within the virtual space that the user profile is requesting to modify. That is, if the user profile is requesting to update a summary header within a canvas, the communication platform may identify data within the channel with which the canvas is associated. In some examples, the data (or content) that the communication platform retrieves or otherwise identifies may differ based on the type of header modification operation. For instance, if the modifying operation is to summarize the channel (or virtual space), the communication platform may retrieve some or all message data and/or file data. If the modifying operation is to display highly active user profiles within the channel, the communication platform may retrieve administrative data (e.g., membership data, role data, etc.), message data (e.g., author data), file data (e.g., author data), and/or any other type of data. Such data may be relevant in determining which user profiles have been active and/or contributing to the channel. If the modifying operation is to display important documents within the channel, the communication platform may retrieve file data (e.g., number of times accessed, number of times modified, roles of the user profiles that access the file, frequency at which user profiles access the file, purpose of the file, etc.) and/or document data (e.g., number of times accessed, number of times modified, roles of the user profiles that access the file, frequency at which user profiles access the file, purpose of the file, etc.). In such cases, such data may be relevant in determining which files and/or documents are most relevant and/or important to the channel. Accordingly, the communication platform may identify, receive, or otherwise retrieve various types of data to utilize when performing the header updating operation.

Based on identifying the data on which the header modifying operation is to be performed, the communication platform may perform the header modifying operation using a machine-learning model. The communication platform may include one or more machine-learning models trained to perform various header modifying operations. For instance, the communication platform may have one or more machine-learning models trained to perform some or all of the header modifying operations described above. As such, upon identifying the data to use in the header operation, the communication platform may provide the data as input into the machine-learning model(s) trained to output content consistent with the modifying operation specified by the user profile. Continuing the example from above, a user profile may select an actionable user interface element on a summarizing header of a canvas. In such instances, the selection of the actionable user interface element may send a request to the communication platform to perform a summarizing header modifying operation. As such, the communication platform may retrieve relevant data which may be used when performing the header summarizing techniques. In such cases, upon retrieving the data from the virtual space, the communication platform may input the data and/or the summarizing modification operation (or the type of modification operation) into the machine-learning model. In such cases, the communication platform may receive content output from the machine-learning model. Such content may be representative of a summary of the virtual space. Of course, this example is not intended to be limiting; in other examples, the header modifying operation may be any other type of operation.

In some examples, the communication platform may cause the content to be displayed via a user interface of a user device associated with the user profile. The communication platform may display or otherwise render the canvas section of the virtual space of to one or more different locations within the communication platform. For instance, the communication platform may include a canvas section (or virtual space) included in a side pane and as such, the communication platform may associate the content with the canvas section. Accordingly, upon receiving a request (e.g., selection) from the user to access the virtual space canvas, the communication platform may cause the canvas section to be displayed which may include the content. In other examples, the communication platform may display the content in a thread pane in the communication platform. In yet other examples, the communication platform may display the content via a separate interface (or notification) such as an overlay interface, popup box, and/or any other type of interface. Alternatively or additionally, the displayed content may include an actionable user interface.

The following detailed description of examples references the accompanying drawings that illustrate specific examples in which the techniques can be practiced. The examples are intended to describe aspects of the systems and methods in sufficient detail to enable those skilled in the art to practice the techniques discussed herein. Other examples can be utilized and changes can be made without departing from the scope of the disclosure. The following detailed description is, therefore, not to be taken in a limiting sense. The scope of the disclosure is defined only by the appended claims, along with the full scope of equivalents to which such claims are entitled.

Group-Based Communication System

FIG. 1 illustrates an example environment 100 for performing techniques described herein. In at least one example, the example environment 100 can be associated with a communication platform that can leverage a network-based computing system to enable users of the communication platform to exchange data. In at least one example, the communication platform can be "group-based" such that the platform, and associated systems, communication channels, messages, collaborative documents, canvases, audio/video conversations, and/or other virtual spaces, have security (that can be defined by permissions) to limit access to a defined group of users. In some examples, such groups of users can be defined by group identifiers, as described above, which can be associated with common access credentials, domains, or the like. In some examples, the communication platform can be a hub, offering a secure and private virtual space to enable users to chat, meet, call, collaborate, transfer files or other data, or otherwise communicate between or among each other. As described above, each group can be associated with a workspace, enabling users associated with the group to chat, meet, call, collaborate, transfer files or other data, or otherwise communicate between or among each other in a secure and private virtual space. In some examples, members of a group, and thus workspace, can be associated with a same organization. In some examples, members of a group, and thus workspace, can be associated with different organizations (e.g., entities with different organization identifiers).

In at least one example, the example environment 100 can include one or more server computing devices (or "server(s)") 102. In at least one example, the server(s) 102 can include one or more servers or other types of computing devices that can be embodied in any number of ways. For example, in the example of a server, the functional components and data can be implemented on a single server, a cluster of servers, a server farm or data center, a cloud-hosted computing service, a cloud-hosted storage service, and so forth, although other computer architectures can additionally or alternatively be used.

In at least one example, the server(s) 102 can communicate with a user computing device 104 via one or more network(s) 106. That is, the server(s) 102 and the user computing device 104 can transmit, receive, and/or store data (e.g., content, information, or the like) using the network(s) 106, as described herein. The user computing device 104 can be any suitable type of computing device, e.g., portable, semi-portable, semi-stationary, or stationary. Some examples of the user computing device 104 can include a tablet computing device, a smart phone, a mobile communication device, a laptop, a netbook, a desktop computing device, a terminal computing device, a wearable computing device, an augmented reality device, an Internet of Things (IoT) device, or any other computing device capable of sending communications and performing the functions according to the techniques described herein. While a single user computing device 104 is shown, in practice, the example environment 100 can include multiple (e.g., tens of, hundreds of, thousands of, millions of) user computing devices. In at least one example, user computing devices, such as the user computing device 104, can be operable by users to, among other things, access communication services via the communication platform. A user can be an individual, a group of individuals, an employer, an enterprise, an organization, and/or the like.

The network(s) 106 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications can depend at least in part upon the type of network, the environment selected, or both. Protocols for communicating over such network(s) 106 are well known and are not discussed herein in detail.

In at least one example, the server(s) 102 can include one or more processors 108, computer-readable media 110, one or more communication interfaces 112, and/or input/output devices 114.

In at least one example, each processor of the processor(s) 108 can be a single processing unit or multiple processing units, and can include single or multiple computing units or multiple processing cores. The processor(s) 108 can be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 108 can be one or more hardware processors and/or logic circuits of any suitable type specifically programmed or configured to execute the algorithms and processes described herein. The processor(s) 108 can be configured to fetch and execute computer-readable instructions stored in the computer-readable media, which can program the processor(s) to perform the functions described herein.

The computer-readable media 110 can include volatile and nonvolatile memory and/or removable and non-removable media implemented in any type of technology for storage of data, such as computer-readable instructions, data structures, program modules, or other data. Such computer-readable media 110 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 102, the computer-readable media 110 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 110 can be used to store any number of functional components that are executable by the processor(s) 108. In many implementations, these functional components comprise instructions or programs that are executable by the processor(s) 108 and that, when executed, specifically configure the processor(s) 108 to perform the actions attributed above to the server(s) 102. Functional components stored in the computer-readable media can optionally include a messaging component 116, an audio/video component 118, a header management component 120, an operating system 122, and a datastore 124.

In at least one example, the messaging component 116 can process messages between users. That is, in at least one example, the messaging component 116 can receive an outgoing message from a user computing device 104 and can send the message as an incoming message to a second user computing device 104. The messages can include direct messages sent from an originating user to one or more specified users and/or communication channel messages sent via a communication channel from the originating user to the one or more users associated with the communication channel. Additionally, the messages can be transmitted in association with a collaborative document, canvas, or other collaborative space. In at least one example, the canvas can include a flexible canvas for curating, organizing, and sharing collections of information between users. In at least one example, the collaborative document can be associated with a document identifier (e.g., virtual space identifier, communication channel identifier, etc.) configured to enable messaging functionalities attributable to a virtual space (e.g., a communication channel) within the collaborative document. That is, the collaborative document can be treated as, and include the functionalities associated with, a virtual space, such as a communication channel. The virtual space, or communication channel, can be a data route used for exchanging data between and among systems and devices associated with the communication platform.

In at least one example, the messaging component 116 can establish a communication route between and among various user computing devices, allowing the user computing devices to communicate and share data between and among each other. In at least one example, the messaging component 116 can manage such communications and/or sharing of data. In some examples, data associated with a virtual space, such a collaborative document, can be presented via a user interface. In addition, metadata associated with each message transmitted via the virtual space, such as a timestamp associated with the message, a sending user identifier, a recipient user identifier, a conversation identifier and/or a root object identifier (e.g., conversation associated with a thread and/or a root object), and/or the like, can be stored in association with the virtual space.

In various examples, the messaging component 116 can receive a message transmitted in association with a virtual space (e.g., direct message instance, communication channel, canvas, collaborative document, etc.). In various examples, the messaging component 116 can identify one or more users associated with the virtual space and can cause a rendering of the message in association with instances of the virtual space on respective user computing devices 104. In various examples, the messaging component 116 can identify the message as an update to the virtual space and, based on the identified update, can cause a notification associated with the update to be presented in association with a sidebar of user interface associated with one or more of the user(s) associated with the virtual space. For example, the messaging component 116 can receive, from a first user account, a message transmitted in association with a virtual space. In response to receiving the message (e.g., interaction data associated with an interaction of a first user with the virtual space), the messaging component 116 can identify a second user associated with the virtual space (e.g., another user that is a member of the virtual space). In some examples, the messaging component 116 can cause a notification of an update to the virtual space to be presented via a sidebar of a user interface associated with a second user account of the second user. In some examples, the messaging component 116 can cause the notification to be presented in response to a determination that the sidebar of the user interface associated with the second user account includes an affordance associated with the virtual space. In such examples, the notification can be presented in association with the affordance associated with the virtual space.

In various examples, the messaging component 116 can be configured to identify a mention or tag associated with the message transmitted in association with the virtual space. In at least one example, the mention or tag can include an @mention (or other special character) of a user identifier that is associated with the communication platform. The user identifier can include a username, real name, or other unique identifier that is associated with a particular user. In response to identifying the mention or tag of the user identifier, the messaging component 116 can cause a notification to be presented on a user interface associated with the user identifier, such as in association with an affordance associated with the virtual space in a sidebar of a user interface associated with the particular user and/or in a virtual space associated with mentions and reactions. That is, the messaging component 116 can be configured to alert a particular user that they were mentioned in a virtual space.

In at least one example, the audio/video component 118 can be configured to manage audio and/or video communications between and among users. In some examples, the audio and/or video communications can be associated with an audio and/or video conversation. In at least one example, the audio and/or video conversation can include a discrete identifier configured to uniquely identify the audio and/or video conversation. In some examples, the audio and/or video component 118 can store user identifiers associated with user accounts of members of a particular audio and/or video conversation, such as to identify user(s) with appropriate permissions to access the particular audio and/or video conversation.

In some examples, communications associated with an audio and/or video conversation ("conversation") can be synchronous and/or asynchronous. That is, the conversation can include a real-time audio and/or video conversation between a first user and a second user during a period of time and, after the first period of time, a third user who is associated with (e.g., is a member of) the conversation can contribute to the conversation. The audio/video component 118 can be configured to store audio and/or video data associated with the conversation, such as to enable users with appropriate permissions to listen and/or view the audio and/or video data.

In some examples, the audio/video component 118 can be configured to generate a transcript of the conversation, and can store the transcript in association with the audio and/or video data. The transcript can include a textual representation of the audio and/or video data. In at least one example, the audio/video component 118 can use known speech recognition techniques to generate the transcript. In some examples, the audio/video component 118 can generate the transcript concurrently or substantially concurrently with the conversation. That is, in some examples, the audio/video component 118 can be configured to generate a textual representation of the conversation while it is being conducted. In some examples, the audio/video component 118 can generate the transcript after receiving an indication that the conversation is complete. The indication that the conversation is complete can include an indication that a host or administrator associated therewith has stopped the conversation, that a threshold number of meeting attendees have closed associated interfaces, and/or the like. That is, the audio/video component 118 can identify a completion of the conversation and, based on the completion, can generate the transcript associated therewith.

In at least one example, the audio/video component 118 can be configured to cause presentation of the transcript in association with a virtual space with which the audio and/or video conversation is associated. For example, a first user can initiate an audio and/or video conversation in association with a communication channel. The audio/video component 118 can process audio and/or video data between attendees of the audio and/or video conversation, and can generate a transcript of the audio and/or video data. In response to generating the transcript, the audio/video component 118 can cause the transcript to be published or otherwise presented via the communication channel. In at least one example, the audio/video component 118 can render one or more sections of the transcript selectable for commenting, such as to enable members of the communication channel to comment on, or further contribute to, the conversation. In some examples, the audio/video component 118 can update the transcript based on the comments.

In at least one example, the audio/video component 118 can manage one or more audio and/or video conversations in association with a virtual space associated with a group (e.g., organization, team, etc.) administrative or command center. The group administrative or command center can be referred to herein as a virtual (and/or digital) headquarters associated with the group. In at least one example, the audio/video component 118 can be configured to coordinate with the messaging component 116 and/or other components of the server(s) 102, to transmit communications in association with other virtual spaces that are associated with the virtual headquarters. That is, the messaging component 116 can transmit data (e.g., messages, images, drawings, files, etc.) associated with one or more communication channels, direct messaging instances, collaborative documents, canvases, and/or the like, that are associated with the virtual headquarters. In some examples, the communication channel(s), direct messaging instance(s), collaborative document(s), canvas(es), and/or the like can have associated therewith one or more audio and/or video conversations managed by the audio/video component 118. That is, the audio and/or video conversations associated with the virtual headquarters can be further associated with, or independent of, one or more other virtual spaces of the virtual headquarters.

In at least some examples, the header management component 120 may update and/or maintain a header of a virtual space. As described below, machine-learning model(s) may be used to determine, update, modify and/or synthesize various types of data within a virtual space. In some examples, a header management component 120 may receive a request from a user profile associated with a virtual space. In such instances, the request may include one or more instructions for the header management component 120 perform various header updating operations. Such header updating operations may include summarizing the content associated with a virtual space, identifying one or more user profiles that are sufficiently active (e.g., number of posts and/or interactions with the virtual space meet or exceed a threshold value) in the virtual space, identifying one or more documents that are relevant (e.g., accessed, shared, or created within a threshold period of time, accessed and/or revised a threshold number of times, etc.) to the virtual space, converting a manual header (e.g., created and/or updated manually) of a canvas to a learned header updated based on a machine-learning model. In some examples, upon receiving the request, the header management component 120 may identify the data (e.g., virtual space data (e.g., administrative data, user posts and/or responses, files, etc.), user data, etc.) on which to perform the header updating operation. Based on identifying the data, the header management component 120 may input such data to one or more machine-learning models trained to output the data consistent with the requested operation. In some examples, the header management component 120 may receive the data from the machine-learning model and cause the data to be displayed to the associating header of the canvas.

In some examples, the communication platform can manage communication channels. In some examples, the communication platform can be a channel-based messaging platform, that in some examples, can be usable by group(s) of users. Users of the communication platform can communicate with other users via communication channels. A communication channel, or virtual space, can be a data route used for exchanging data between and among systems and devices associated with the communication platform. In some examples, a channel can be a virtual space where people can post messages, documents, and/or files. In some examples, access to channels can be controlled by permissions. In some examples, channels can be limited to a single organization, shared between different organizations, public, private, or special channels (e.g., hosted channels with guest accounts where guests can make posts but are prevented from performing certain actions, such as inviting other users to the channel). In some examples, some users can be invited to channels via email, channel invites, direct messages, text messages, and the like. Examples of channels and associated functionality are discussed throughout this disclosure.

In at least one example, the operating system 122 can manage the processor(s) 108, computer-readable media 110, hardware, software, etc. of the server(s) 102.

In at least one example, the datastore 124 can be configured to store data that is accessible, manageable, and updatable. In some examples, the datastore 124 can be integrated with the server(s) 102, as shown in FIG. 1. In other examples, the datastore 124 can be located remotely from the server(s) 102 and can be accessible to the server(s) 102 and/or user device(s), such as the user device 104. The datastore 124 can comprise multiple databases, which can include user/org data 126 and/or virtual space data 128. Additional or alternative data may be stored in the data store and/or one or more other data stores.

In at least one example, the user/org data 126 can include data associated with users of the communication platform. In at least one example, the user/org data 126 can store data in user profiles (which can also be referred to as "user accounts"), which can store data associated with a user, including, but not limited to, one or more user identifiers associated with multiple, different organizations or entities with which the user is associated, one or more communication channel identifiers associated with communication channels to which the user has been granted access, one or more group identifiers for groups (or, organizations, teams, entities, or the like) with which the user is associated, an indication whether the user is an owner or manager of any communication channels, an indication whether the user has any communication channel restrictions, a plurality of messages, a plurality of emojis, a plurality of conversations, a plurality of conversation topics, an avatar, an email address, a real name (e.g., John Doe), a username (e.g., j doc), a password, a time zone, a status, a token, and the like.

In at least one example, the user/org data 126 can include permission data associated with permissions of individual users of the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. Permissions associated with an individual user can be mapped to, or otherwise associated with, an account or profile within the user/org data 126. In some examples, permissions can indicate which users can communicate directly with other users, which channels a user is permitted to access, restrictions on individual channels, which workspaces the user is permitted to access, restrictions on individual workspaces, and the like. In at least one example, the permissions can support the communication platform by maintaining security for limiting access to a defined group of users. In some examples, such users can be defined by common access credentials, group identifiers, or the like, as described above.

In at least one example, the user/org data 126 can include data associated with one or more organizations of the communication platform. In at least one example, the user/org data 126 can store data in organization profiles, which can store data associated with an organization, including, but not limited to, one or more user identifiers associated with the organization, one or more virtual space identifiers associated with the organization (e.g., workspace identifiers, communication channel identifiers, direct message instance identifiers, collaborative document identifiers, canvas identifiers, audio/video conversation identifiers, etc.), an organization identifier associated with the organization, one or more organization identifiers associated with other organizations that are authorized for communication with the organization, and the like.

In at least one example, the virtual space data 128 can include data associated with one or more virtual spaces associated with the communication platform. The virtual space data 128 can include textual data, audio data, video data, images, files, and/or any other type of data configured to be transmitted in association with a virtual space. Non-limiting examples of virtual spaces include workspaces, communication channels, direct messaging instances, collaborative documents, canvases, and audio and/or video conversations. In at least one example, the virtual space data can store data associated with individual virtual spaces separately, such as based on a discrete identifier associated with each virtual space. In some examples, a first virtual space can be associated with a second virtual space. In such examples, first virtual space data associated with the first virtual space can be stored in association with the second virtual space. For example, data associated with a collaborative document that is generated in association with a communication channel may be stored in association with the communication channel. For another example, data associated with an audio and/or video conversation that is conducted in association with a communication channel can be stored in association with the communication channel.

As discussed above, each virtual space of the communication platform can be assigned a discrete identifier that uniquely identifies the virtual space. In some examples, the virtual space identifier associated with the virtual space can include a physical address in the virtual space data 128 where data related to that virtual space is stored. A virtual space may be "public," which may allow any user within an organization (e.g., associated with an organization identifier) to join and participate in the data sharing through the virtual space, or a virtual space may be "private," which may restrict data communications in the virtual space to certain users or users having appropriate permissions to view. In some examples, a virtual space may be "shared," which may allow users associated with different organizations (e.g., entities associated with different organization identifiers) to join and participate in the data sharing through the virtual space. Shared virtual spaces (e.g., shared channels) may be public such that they are accessible to any user of either organization, or they may be private such that they are restricted to access by certain users (e.g., users with appropriate permissions) of both organizations.

In some examples, the datastore 124 can be partitioned into discrete items of data that may be accessed and managed individually (e.g., data shards). Data shards can simplify many technical tasks, such as data retention, unfurling (e.g., detecting that message contents include a link, crawling the link's metadata, and determining a uniform summary of the metadata), and integration settings. In some examples, data shards can be associated with organizations, groups (e.g., workspaces), communication channels, users, or the like.

In some examples, individual organizations can be associated with a database shard within the datastore 124 that stores data related to a particular organization identification. For example, a database shard may store electronic communication data associated with members of a particular organization, which enables members of that particular organization to communicate and exchange data with other members of the same organization in real time or near-real time. In this example, the organization itself can be the owner of the database shard and has control over where and how the related data is stored. In some examples, a database shard can store data related to two or more organizations (e.g., as in a shared virtual space).

In some examples, individual groups can be associated with a database shard within the datastore 124 that stores data related to a particular group identification (e.g., workspace). For example, a database shard may store electronic communication data associated with members of a particular group, which enables members of that particular group to communicate and exchange data with other members of the same group in real time or near-real time. In this example, the group itself can be the owner of the database shard and has control over where and how the related data is stored.

In some examples, a virtual space can be associated with a database shard within the datastore 124 that stores data related to a particular virtual space identification. For example, a database shard may store electronic communication data associated with the virtual space, which enables members of that particular virtual space to communicate and exchange data with other members of the same virtual space in real time or near-real time. As discussed above, the communications via the virtual space can be synchronous and/or asynchronous. In at least one example, a group or organization can be the owner of the database shard and can control where and how the related data is stored.

In some examples, individual users can be associated with a database shard within the datastore 124 that stores data related to a particular user account. For example, a database shard may store electronic communication data associated with an individual user, which enables the user to communicate and exchange data with other users of the communication platform in real time or near-real time. In some examples, the user itself can be the owner of the database shard and has control over where and how the related data is stored.

In some examples, such as when a channel is shared between two organizations, each organization can be associated with its own encryption key. When a user associated with one organization posts a message or file to the shared channel it can be encrypted in the datastore 124 with the encryption key specific to the organization and the other organization can decrypt the message or file prior to accessing the message or file. Further, in examples where organizations are in different geographical areas, data associated with a particular organization can be stored in a location corresponding to the organization and temporarily cached at a location closer to a client (e.g., associated with the other organization) when such messages or files are to be accessed. Data can be maintained, stored, and/or deleted in the datastore 124 in accordance with a data governance policy associated with each specific organization.

The communication interface(s) 112 can include one or more interfaces and hardware components for enabling communication with various other devices (e.g., the user computing device 104), such as over the network(s) 106 or directly. In some examples, the communication interface(s) 112 can facilitate communication via WebSockets, Application Programming Interfaces (APIs) (e.g., using API calls), Hypertext Transfer Protocols (HTTPs), etc.

The server(s) 102 can further be equipped with various input/output devices 114 (e.g., I/O devices). Such I/O devices 114 can include a display, various user interface controls (e.g., buttons, joystick, keyboard, mouse, touch screen, etc.), audio speakers, connection ports and so forth.

In at least one example, the user computing device 104 can include one or more processors 130, computer-readable media 132, one or more communication interfaces 134, and input/output devices 136.

In at least one example, each processor of the processor(s) 130 can be a single processing unit or multiple processing units, and can include single or multiple computing units or multiple processing cores. The processor(s) 130 can comprise any of the types of processors described above with reference to the processor(s) 108 and may be the same as or different than the processor(s) 108.

The computer-readable media 132 can comprise any of the types of computer-readable media 132 described above with reference to the computer-readable media 110 and may be the same as or different than the computer-readable media 110. Functional components stored in the computer-readable media can optionally include at least one application 138 and an operating system 140.

In at least one example, the application 138 can be a mobile application, a web application, or a desktop application, which can be provided by the communication platform or which can be an otherwise dedicated application. In some examples, individual user computing devices associated with the environment 100 can have an instance or versioned instance of the application 138, which can be downloaded from an application store, accessible via the Internet, or otherwise executable by the processor(s) 130 to perform operations as described herein. That is, the application 138 can be an access point, enabling the user computing device 104 to interact with the server(s) 102 to access and/or use communication services available via the communication platform. In at least one example, the application 138 can facilitate the exchange of data between and among various other user computing devices, for example via the server(s) 102. In at least one example, the application 138 can present user interfaces, as described herein. In at least one example, a user can interact with the user interfaces via touch input, keyboard input, mouse input, spoken input, or any other type of input.

A non-limiting example of a user interface 142 is shown in FIG. 1. As illustrated in FIG. 1, the user interface 142 can present data associated with one or more virtual spaces, which may include one or more workspaces. That is, in some examples, the user interface 142 can integrate data from multiple workspaces into a single user interface so that the user (e.g., of the user computing device 104) can access and/or interact with data associated with the multiple workspaces that he or she is associated with and/or otherwise communicate with other users associated with the multiple workspaces. In some examples, the user interface 142 can include a first region 144, or pane, that includes indicator(s) (e.g., user interface element(s) or object(s)) associated with workspace(s) with which the user (e.g., account of the user) is associated. In some examples, the user interface 142 can include a second region 146, or pane, that includes indicator(s) (e.g., user interface element(s), affordance(s), object(s), etc.) representing data associated with the workspace(s) with which the user (e.g., account of the user) is associated. In at least one example, the second region 146 can represent a sidebar of the user interface 142.

In at least one example, the user interface 142 can include a third region 148, or pane, that can be associated with a data feed (or, "feed") indicating messages posted to and/or actions taken with respect to one or more communication channels and/or other virtual spaces for facilitating communications (e.g., a virtual space associated with direct message communication(s), a virtual space associated with event(s) and/or action(s), etc.) as described herein. In at least one example, data associated with the third region 148 can be associated with the same or different workspaces. That is, in some examples, the third region 148 can present data associated with the same or different workspaces via an integrated feed. In some examples, the data can be organized and/or is sortable by workspace, time (e.g., when associated data is posted or an associated operation is otherwise performed), type of action, communication channel, user, or the like. In some examples, such data can be associated with an indication of which user (e.g., member of the communication channel) posted the message and/or performed an action. In examples where the third region 148 presents data associated with multiple workspaces, at least some data can be associated with an indication of which workspace the data is associated with. In some examples, the third region 148 may be resized or popped out as a standalone window.

In at least one example, the operating system 140 can manage the processor(s) 130, computer-readable media 132, hardware, software, etc. of the server(s) 102.

The communication interface(s) 134 can include one or more interfaces and hardware components for enabling communication with various other devices (e.g., the user computing device 104), such as over the network(s) 106 or directly. In some examples, the communication interface(s) 134 can facilitate communication via WebSockets, APIs (e.g., using API calls), HTTPs, etc.

The user computing device 104 can further be equipped with various input/output devices 136 (e.g., I/O devices). Such I/O devices 136 can include a display, various user interface controls (e.g., buttons, joystick, keyboard, mouse, touch screen, etc.), audio speakers, connection ports and so forth.

While techniques described herein are described as being performed by the messaging component 116, the audio/video component 118, and the application 138, techniques described herein can be performed by any other component, or combination of components, which can be associated with the server(s) 102, the user computing device 104, or a combination thereof.

User Interface for a Group-Based Communication System

Figure 2A:
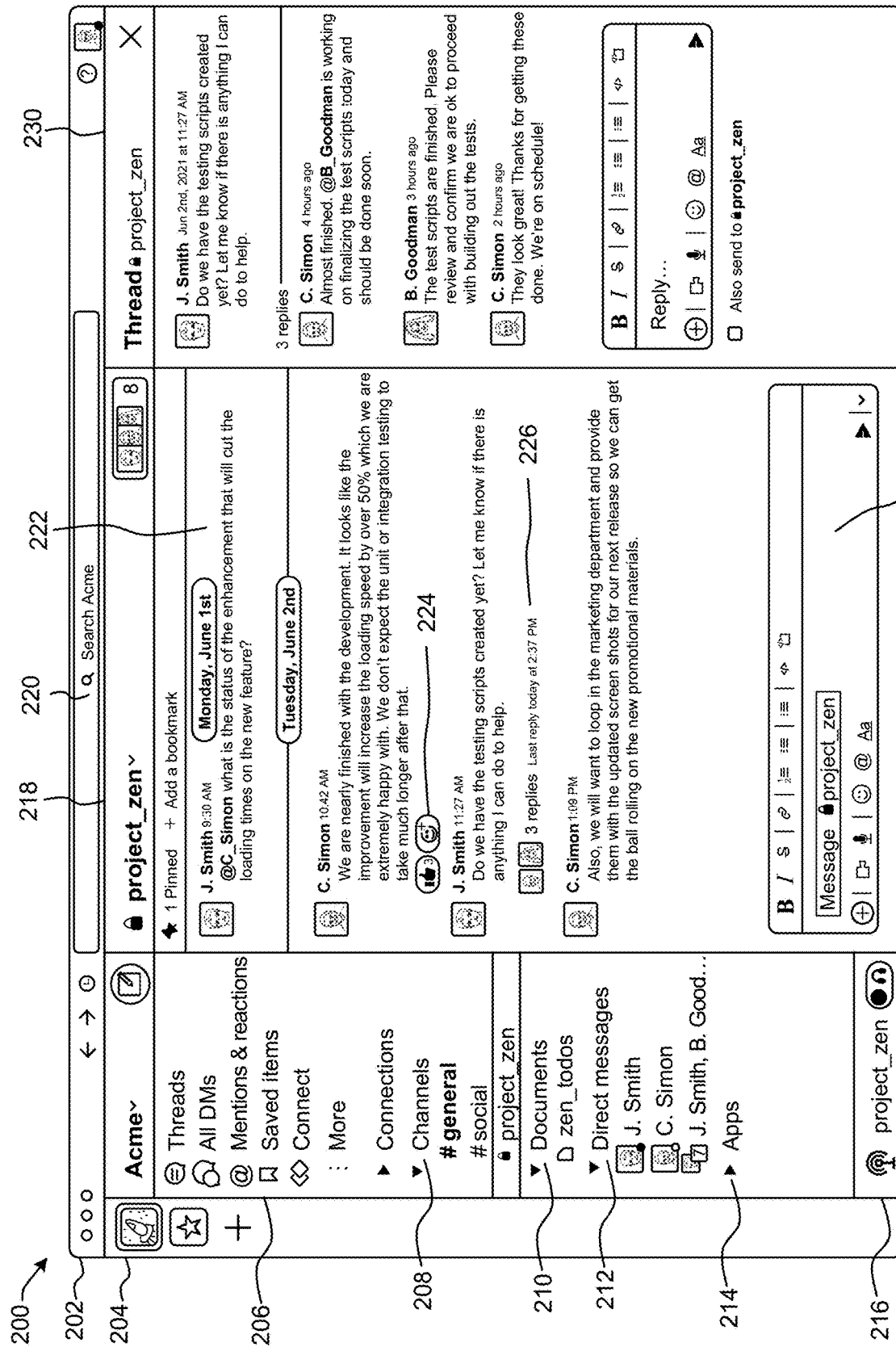
FIG. 2A illustrates a user interface for a group-based communication system for certain examples.

FIG. 2A illustrates a user interface 200 of a group-based communication system, which will be useful in illustrating the operation of various examples discussed herein. The group-based communication system may include communication data such as messages, queries, files, mentions, users or user profiles, interactions, tickets, channels, applications integrated into one or more channels, conversations, workspaces, or other data generated by or shared between users of the group-based communication system. In some instances, the communication data may comprise data associated with a user, such as a user identifier, channels to which the user has been granted access, groups with which the user is associated, permissions, and other user-specific information.

The user interface 200 comprises a plurality of objects such as panes, text entry fields, buttons, messages, or other user interface components that are viewable by a user of the group-based communication system. As depicted, the user interface 200 comprises a title bar 202, a workspace pane 204, a navigation pane 206, channels 208, documents 210 (e.g., collaborative documents), direct messages 212, applications 214, a synchronous multimedia collaboration session pane 216, and channel pane 218.

By way of example and without limitation, when a user opens the user interface 200 they can select a workspace via the workspace pane 204. A particular workspace may be associated with data specific to the workspace and accessible via permissions associated with the workspace. Different sections of the navigation pane 206 can present different data and/or options to a user. Different graphical indicators may be associated with virtual spaces (e.g., channels) to summarize an attribute of the channel (e.g., whether the channel is public, private, shared between organizations, locked, etc.). When a user selects a channel, a channel pane 218 may be presented. In some examples, the channel pane 218 can include a header, pinned items (e.g., documents or other virtual spaces), an "about" document providing an overview of the channel, and the like. In some cases, members of a channel can search within the channel, access content associated with the channel, add other members, post content, and the like. In some examples, depending on the permissions associated with a channel, users who are not members of the channel may have limited ability to interact with (or even view or otherwise access) a channel. As users navigate within a channel they can view messages 222 and may react to messages (e.g., a reaction 224), reply in a thread, start threads, and the like. Further, a channel pane 218 can include a compose pane 228 to compose message(s) and/or other data to associate with a channel. In some examples, the user interface 200 can include a threads pane 230 that provides additional levels of detail of the messages 222. In some examples, different panes can be resized, panes can be popped out to independent windows, and/or independent windows can be merged to multiple panes of the user interface 200. In some examples, users may communicate with other users via a collaboration pane 216, which may provide synchronous or asynchronous voice and/or video capabilities for communication. Of course, these are illustrative examples and additional examples of the aforementioned features are provided throughout this disclosure.

In some examples, title bar 202 comprises search bar 220. The search bar 220 may allow users to search for content located in the current workspace of the group-based communication system, such as files, messages, channels, members, commands, functions, and the like. Users may refine their searches by attributes such as content type, content author, and by users associated with the content. Users may optionally search within specific workspaces, channels, direct message conversations, or documents. In some examples, the title bar 202 comprises navigation commands allowing a user to move backwards and forwards between different panes, as well as to view a history of accessed content. In some examples, the title bar 202 may comprise additional resources such as links to help documents and user configuration settings.

In some examples, the group-based communication system can comprise a plurality of distinct workspaces, where each workspace is associated with different groups of users and channels. Each workspace can be associated with a group identifier and one or more user identifiers can be mapped to, or otherwise associated with, the group identifier. Users corresponding to such user identifiers may be referred to as members of the group. In some examples, the user interface 200 comprises the workspace pane 204 for navigating between, adding, or deleting various workspaces in the group-based communication system. For example, a user may be a part of a workspace for Acme, where the user is an employee of or otherwise affiliated with Acme. The user may also be a member of a local volunteer organization that also uses the group-based communication system to collaborate. To navigate between the two groups, the user may use the workspace pane 204 to change from the Acme workspace to the volunteer organization workspace. A workspace may comprise one or more channels that are unique to that workspace and/or one or more channels that are shared between one or more workspaces. For example, the Acme company may have a workspace for Acme projects, such as Project Zen, a workspace for social discussions, and an additional workspace for general company matters. In some examples, an organization, such as a particular company, may have a plurality of workspaces, and the user may be associated with one or more workspaces belonging to the organization. In yet other examples, a particular workspace can be associated with one or more organizations or other entities associated with the group-based communication system.

In some examples, the navigation pane 206 permits users to navigate between virtual spaces such as pages, channels 208, collaborative documents 210 (such as those discussed at FIG. 2D), applications 214, and direct messages 212 within the group-based communication system. For example, the navigation pane 206 can include indicators representing virtual spaces that can aggregate data associated with a plurality of virtual spaces of which the user is a member. In at least one example, each virtual space can be associated with an indicator in the navigation pane 206. In some examples, an indicator can be associated with an actuation mechanism (e.g., an affordance, also referred to as a graphical element) such that when actuated, can cause the user interface 200 to present data associated with the corresponding virtual space. In at least one example, a virtual space can be associated with all unread data associated with each of the workspaces with which the user is associated. That is, in some examples, if the user requests to access the virtual space associated with "unreads," all data that has not been read (e.g., viewed) by the user can be presented, for example in a feed. In such examples, different types of events and/or actions, which can be associated with different virtual spaces, can be presented via the same feed. In some examples, such data can be organized and/or is sortable by associated virtual space (e.g., virtual space via which the communication was transmitted), time, type of action, user, and/or the like. In some examples, such data can be associated with an indication of which user (e.g., member of the associated virtual space) posted the message and/or performed an action.

In some examples, a virtual space can be associated with the same type of event and/or action. For example, "threads" can be associated with messages, files, etc. posted in threads to messages posted in a virtual space and "mentions and reactions" can be associated with messages or threads where the user has been mentioned (e.g., via a tag) or another user has reacted (e.g., via an emoji, reaction, or the like) to a message or thread posted by the user. That is, in some examples, the same types of events and/or actions, which can be associated with different virtual spaces, can be presented via the same feed. As with the "unreads" virtual space, data associated with such virtual spaces can be organized and/or is sortable by virtual space, time, type of action, user, and/or the like.

In some examples, a virtual space can be associated with facilitating communications between a user and other users of the communication platform. For example, "connect" can be associated with enabling the user to generate invitations to communicate with one or more other users. In at least one example, responsive to receiving an indication of selection of the "connect" indicator, the communication platform can cause a connections interface to be presented.

In some examples, a virtual space can be associated with one or more boards or collaborative documents with which the user is associated. In at least one example, a document can include a collaborative document configured to be accessed and/or edited by two or more users with appropriate permissions (e.g., viewing permissions, editing permissions, etc.). In at least one example, if the user requests to access the virtual space associated with one or more documents with which the user is associated, the one or more documents can be presented via the user interface 200. In at least one example, the documents, as described herein, can be associated with an individual (e.g., private document for a user), a group of users (e.g., collaborative document), and/or one or more communication channels (e.g., members of the communication channel rendered access permissions to the document), such as to enable users of the communication platform to create, interact with, and/or view data associated with such documents. In some examples, the collaborative document can be a virtual space, a board, a canvas, a page, or the like for collaborative communication and/or data organization within the communication platform. In at least one example, the collaborative document can support editable text and/or objects that can be ordered, added, deleted, modified, and/or the like. In some examples, the collaborative document can be associated with permissions defining which users of a communication platform can view and/or edit the document. In some examples, a collaborative document can be associated with a communication channel, and members of the communication channel can view and/or edit the document. In some examples, a collaborative document can be sharable such that data associated with the document is accessible to and/or interactable for members of the multiple communication channels, workspaces, organizations, and/or the like.

In some examples, a virtual space can be associated with a group (e.g., organization, team, etc.) headquarters (e.g., administrative or command center). In at least one example, the group headquarters can include a virtual or digital headquarters for administrative or command functions associated with a group of users. For example, "HQ" can be associated with an interface including a list of indicators associated with virtual spaces configured to enable associated members to communicate. In at least one example, the user can associate one or more virtual spaces with the "HQ" virtual space, such as via a drag and drop operation. That is, the user can determine relevant virtual space(s) to associate with the virtual or digital headquarters, such as to associate virtual space(s) that are important to the user therewith.

In some examples, a virtual space can be associated with one or more boards or collaborative documents with which the user is associated. In at least one example, a document can include a collaborative document configured to be accessed and/or edited by two or more users with appropriate permissions (e.g., viewing permissions, editing permissions, etc.). In at least one example, if the user requests to access the virtual space associated with one or more documents with which the user is associated, the one or more documents can be presented via the user interface 200. In at least one example, the documents, as described herein, can be associated with an individual (e.g., private document for a user), a group of users (e.g., collaborative document), and/or one or more communication channels (e.g., members of the communication channel rendered access permissions to the document), such as to enable users of the communication platform to create, interact with, and/or view data associated with such documents. In some examples, the collaborative document can be a virtual space, a board, a canvas, a page, or the like for collaborative communication and/or data organization within the communication platform. In at least one example, the collaborative document can support editable text and/or objects that can be ordered, added, deleted, modified, and/or the like. In some examples, the collaborative document can be associated with permissions defining which users of a communication platform can view and/or edit the document. In some examples, a collaborative document can be associated with a communication channel, and members of the communication channel can view and/or edit the document. In some examples, a collaborative document can be sharable such that data associated with the document is accessible to and/or interactable for members of the multiple communication channels, workspaces, organizations, and/or the like.

Additionally or in the alternative, in some examples, a virtual space can be associated with one or more canvases with which the user is associated. In at least one example, the canvas can include a flexible canvas for curating, organizing, and sharing collections of information between users. That is, the canvas can be configured to be accessed and/or modified by two or more users with appropriate permissions. In at least one example, the canvas can be configured to enable sharing of text, images, videos, GIFs, drawings (e.g., user-generated drawing via a canvas interface), gaming content (e.g., users manipulating gaming controls synchronously or asynchronously), and/or the like. In at least one example, modifications to a canvas can include adding, deleting, and/or modifying previously shared (e.g., transmitted, presented) data. In some examples, content associated with a canvas can be shareable via another virtual space, such that data associated with the canvas is accessible to and/or rendered interactable for members of the virtual space.

The navigation pane 206 may further comprise indicators representing communication channels (e.g., the channels 208). In some examples, the communication channels can include public channels, private channels, shared channels (e.g., between groups or organizations), single workspace channels, cross-workspace channels, combinations of the foregoing, or the like. In some examples, the communication channels represented can be associated with a single workspace. In some examples, the communication channels represented can be associated with different workspaces (e.g., cross-workspace). In at least one example, if a communication channel is cross-workspace (e.g., associated with different workspaces), the user may be associated with both workspaces, or may only be associated with one of the workspaces. In some examples, the communication channels represented can be associated with combinations of communication channels associated with a single workspace and communication channels associated with different workspaces.

In some examples, the navigation pane 206 may depict some or all of the communication channels that the user has permission to access (e.g., as determined by the permission data). In such examples, the communication channels can be arranged alphabetically, based on most recent interaction, based on frequency of interactions, based on communication channel type (e.g., public, private, shared, cross-workspace, etc.), based on workspace, in user-designated sections, or the like. In some examples, the navigation pane 206 can depict some or all of the communication channels that the user is a member of, and the user can interact with the user interface 200 to browse or view other communication channels that the user is not a member of but are not currently displayed in the navigation pane 206. In some examples, different types of communication channels (e.g., public, private, shared, cross-workspace, etc.) can be in different sections of the navigation pane 206, or can have their own sub-regions or sub-panes in the user interface 200. In some examples, communication channels associated with different workspaces can be in different sections of the navigation pane 206, or can have their own regions or panes in the user interface 200.

In some examples, the indicators can be associated with graphical elements that visually differentiate types of communication channels. For example, project_zen is associated with a lock graphical element. As a non-limiting example, and for the purpose of this discussion, the lock graphical element can indicate that the associated communication channel, project_zen, is private and access thereto is limited, whereas another communication channel, general, is public and access thereto is available to any member of an organization with which the user is associated. In some examples, additional or alternative graphical elements can be used to differentiate between shared communication channels, communication channels associated with different workspaces, communication channels with which the user is or is not a current member, and/or the like.

In at least one example, the navigation pane 206 can include indicators representative of communications with individual users or multiple specified users (e.g., instead of all, or a subset of, members of an organization). Such communications can be referred to as "direct messages." The navigation pane 206 can include indicators representative of virtual spaces that are associated with private messages between one or more users.

The direct messages 212 may be communications between a first user and a second user, or they may be multi-person direct messages between a first user and two or more second users. The navigation pane 206 may be sorted and organized into hierarchies or sections depending on the user's preferences. In some examples, all of the channels to which a user has been granted access may appear in the navigation pane 206. In other examples, the user may choose to hide certain channels or collapse sections containing certain channels. Items in the navigation pane 206 may indicate when a new message or update has been received or is currently unread, such as by bolding the text associated with a channel in which an unread message is located or adding an icon or badge (for example, with a count of unread messages) to the channel name. In some examples, the group-based communication system may additionally or alternatively store permissions data associated with permissions of individual users of the group-based communication system, indicating which channels a user may view or join. Permissions can indicate, for example, which users can communicate directly with other users, which channels a user is permitted to access, restrictions on individual channels, which workspaces the user is permitted to access, and restrictions on individual workspaces.

Additionally or in the alternative, the navigation pane 206 can include a sub-section that is a personalized sub-section associated with a team of which the user is a member. That is, the "team" sub-section can include affordance(s) of one or more virtual spaces that are associated with the team, such as communication channels, collaborative documents, direct messaging instances, audio or video synchronous or asynchronous meetings, and/or the like. In at least one example, the user can associate selected virtual spaces with the team sub-section, such as by dragging and dropping, pinning, or otherwise associating selected virtual spaces with the team sub-section.

Channels Within the Group-Based Communication System

In some examples, the group-based communication system is a channel-based messaging platform, as shown in FIG. 2A. Within the group-based communication system, communication may be organized into channels, each dedicated to a particular topic and a set of users. Channels are generally a virtual space relating to a particular topic comprising messages and files posted by members of the channel.

For purposes of this discussion, a "message" can refer to any electronically generated digital object provided by a user using the user computing device 104 and that is configured for display within a communication channel and/or other virtual space for facilitating communications (e.g., a virtual space associated with direct message communication(s), etc.) as described herein. A message may include any text, image, video, audio, or combination thereof provided by a user (using a user computing device). For instance, the user may provide a message that includes text, as well as an image and a video, within the message as message contents. In such an example, the text, image, and video would comprise the message. Each message sent or posted to a communication channel of the communication platform can include metadata comprising a sending user identifier, a message identifier, message contents, a group identifier, a communication channel identifier, or the like. In at least one example, each of the foregoing identifiers may comprise American Standard Code for Information Interchange (ASCII) text, a pointer, a memory address, or the like.

The channel discussion may persist for days, months, or years and provide a historical log of user activity. Members of a particular channel can post messages within that channel that are visible to other members of that channel together with other messages in that channel. Users may select a channel for viewing to see only those messages relevant to the topic of that channel without seeing messages posted in other channels on different topics. For example, a software development company may have different channels for each software product being developed, where developers working on each particular project can converse on a generally singular topic (e.g., project) without noise from unrelated topics. Because the channels are generally persistent and directed to a particular topic or group, users can quickly and easily refer to previous communications for reference. In some examples, the channel pane 218 may display information related to a channel that a user has selected in the navigation pane 206. For example, a user may select the project_zen channel to discuss the ongoing software development efforts for Project Zen. In some examples, the channel pane 218 may include a header comprising information about the channel, such as the channel name, the list of users in the channel, and other channel controls. Users may be able to pin items to the header for later access and add bookmarks to the header. In some examples, links to collaborative documents may be included in the header. In further examples, each channel may have a corresponding virtual space which includes channel-related information such as a channel summary, tasks, bookmarks, pinned documents, and other channel-related links which may be editable by members of the channel.

A communication channel or other virtual space can be associated with data and/or content other than messages, or data and/or content that is associated with messages. For example, non-limiting examples of additional data that can be presented via the channel pane 218 of the user interface 200 include collaborative documents (e.g., documents that can be edited collaboratively, in real-time or near real-time, etc.), audio and/or video data associated with a conversation, members added to and/or removed from the communication channel, file(s) (e.g., file attachment(s)) uploaded and/or removed from the communication channel), application(s) added to and/or removed from the communication channel, post(s) (data that can be edited collaboratively, in near real-time by one or members of a communication channel) added to and/or removed from the communication channel, description added to, modified, and/or removed from the communication channel, modifications of properties of the communication channel, etc.

The channel pane 218 may include messages such as message 222, which is content posted by a user into the channel. Users may post text, images, videos, audio, or any other file as the message 222. In some examples, particular identifiers (in messages or otherwise) may be denoted by prefixing them with predetermined characters. For example, channels may be prefixed by the "#" character (as in #project_zen) and username may be prefixed by the "@" character (as in @J_Smith or @User_A). Messages such as the message 222 may include an indication of which user posted the message and the time at which the message was posted. In some examples, users may react to messages by selecting a reaction button 224. The reaction button 224 allows users to select an icon (sometimes called a reacji in this context), such as a thumbs up, to be associated with the message. Users may respond to messages, such as the message 222, of another user with a new message. In some examples, such conversations in channels may further be broken out into threads. Threads may be used to aggregate messages related to a particular conversation together to make the conversation easier to follow and reply to, without cluttering the main channel with the discussion. Under the message beginning the thread appears a thread reply preview 226. The thread reply preview 226 may show information related to the thread, such as, for example, the number of replies and the members who have replied. Thread replies may appear in a thread pane 230 that may be separate from the channel pane 218 and may be viewed by other members of the channel by selecting the thread reply preview 226 in the channel pane 218.

In some examples, one or both of the channel pane 218 and the thread pane 230 may include a compose pane 228. In some examples, the compose pane 228 allows users to compose and transmit messages 222 to the members of the channel or to those members of the channel who are following the thread (when the message is sent in a thread). The compose pane 228 may have text editing functions such as bold, strikethrough, and italicize, and/or may allow users to format their messages or attach files such as collaborative documents, images, videos, or any other files to share with other members of the channel. In some examples, the compose pane 228 may enable additional formatting options such as numbered or bulleted lists via either the user interface or an API. The compose pane 228 may also function as a workflow trigger to initiate workflows related to a channel or message. In further examples, links or documents sent via the compose pane 228 may include unfurl instructions related to how the content should be displayed.

Synchronous Multimedia Collaboration Sessions

Figure 2B:
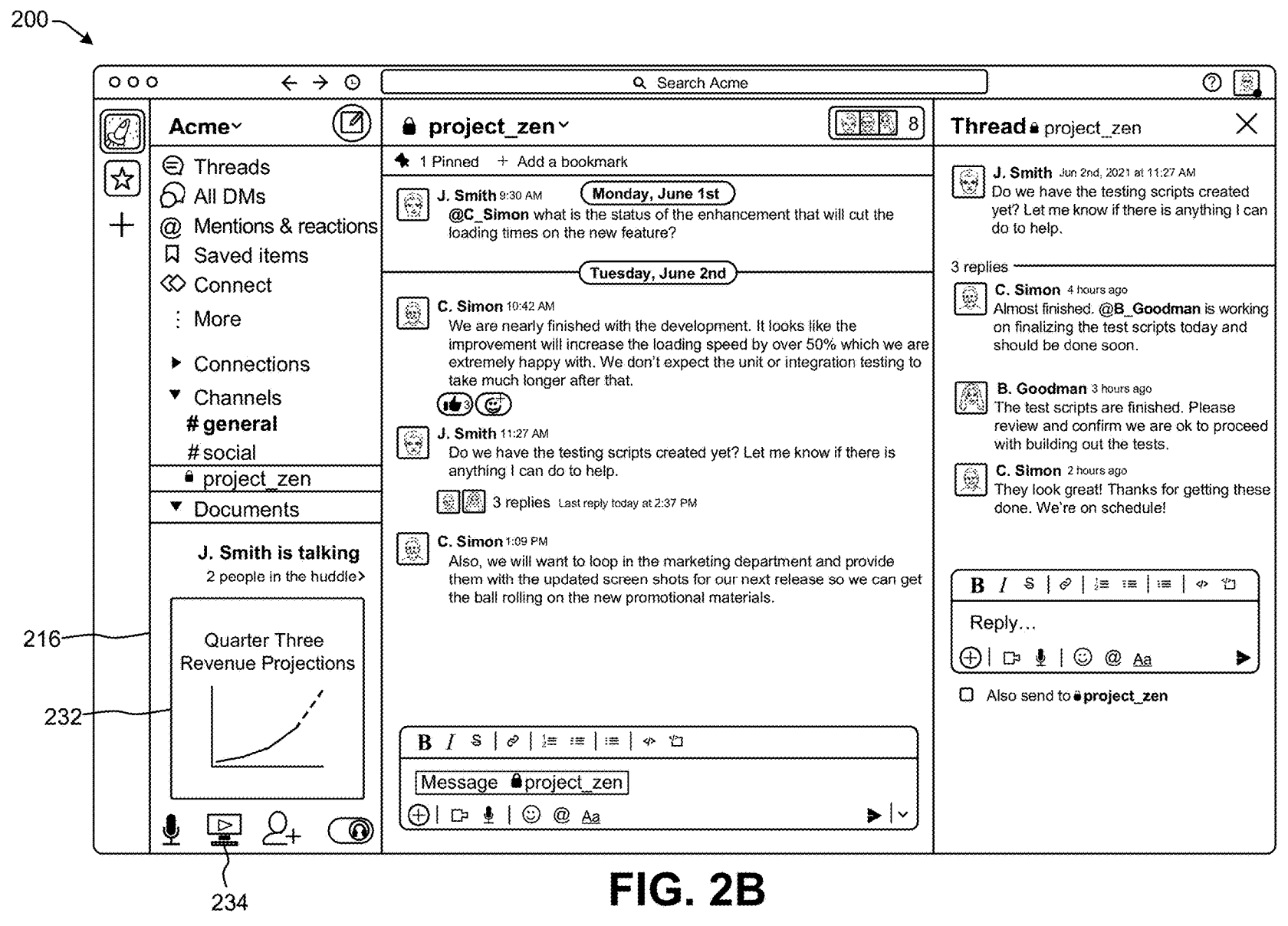

FIG. 2B illustrates a multimedia collaboration session (e.g., a synchronous multimedia collaboration session) that has been triggered from a channel, as shown in pane 216. Synchronous multimedia collaboration sessions may provide ambient, ad hoc multimedia collaboration in the group-based communication system. Users of the group-based communication system can quickly and easily join and leave these synchronous multimedia collaboration sessions at any time, without disrupting the synchronous multimedia collaboration session for other users. In some examples, synchronous multimedia collaboration sessions may be based around a particular topic, a particular channel, a particular direct message or multi-person direct message, or a set of users, while in other examples, synchronous multimedia collaboration sessions may exist without being tied to any channel, topic, or set of users.

Synchronous multimedia collaboration session pane 216 may be associated with a session conducted for a plurality of users in a channel, users in a multi-person direct message conversation, or users in a direct message conversation. Thus, a synchronous multimedia collaboration session may be started for a particular channel, multi-person direct message conversation, or direct message conversation by one or more members of that channel or conversation. Users may start a synchronous multimedia collaboration session in a channel as a means of communicating with other members of that channel who are presently online. For example, a user may have an urgent decision and want immediate verbal feedback from other members of the channel. As another example, a synchronous multimedia collaboration session may be initiated with one or more other users of the group-based communication system through direct messaging. In some examples, the audience of a synchronous multimedia collaboration session may be determined based on the context in which the synchronous multimedia collaboration session was initiated. For example, starting a synchronous multimedia collaboration session in a channel may automatically invite the entire channel to attend. As another example. Starting a synchronous multimedia collaboration session allows the user to start an immediate audio and/or video conversation with other members of the channel without requiring scheduling or initiating a communication session through a third-party interface. In some examples, users may be directly invited to attend a synchronous multimedia collaboration session via a message or notification.

Synchronous multimedia collaboration sessions may be short, ephemeral sessions from which no data is persisted. Alternatively, in some examples, synchronous multimedia collaboration sessions may be recorded, transcribed, and/or summarized for later review. In other examples, contents of the synchronous multimedia collaboration session may automatically be persisted in a channel associated with the synchronous multimedia collaboration session. Members of a particular synchronous multimedia collaboration session can post messages within a messaging thread associated with that synchronous multimedia collaboration session that are visible to other members of that synchronous multimedia collaboration session together with other messages in that thread.

The multimedia in a synchronous multimedia collaboration session may include collaboration tools such as any or all of audio, video, screen sharing, collaborative document editing, whiteboarding, co-programming, or any other form of media. Synchronous multimedia collaboration sessions may also permit a user to share the user's screen with other members of the synchronous multimedia collaboration session. In some examples, members of the synchronous multimedia collaboration session may mark-up, comment on, draw on, or otherwise annotate a shared screen. In further examples, such annotations may be saved and persisted after the synchronous multimedia collaboration session has ended. A canvas may be created directly from a synchronous multimedia collaboration session to further enhance the collaboration between users.

In some examples, a user may start a synchronous multimedia collaboration session via a toggle in synchronous multimedia collaboration session pane 216 shown in FIG. 2B. Once a synchronous multimedia collaboration session has been started, synchronous multimedia collaboration session pane 216 may be expanded to provide information about the synchronous multimedia collaboration session such as how many members are present, which user is currently talking, which user is sharing the user's screen, and/or screen share preview 232. In some examples, users in the synchronous multimedia collaboration session may be displayed with an icon indicating that they are participating in the synchronous multimedia collaboration session. In further examples, an expanded view of the participants may show which users are active in the synchronous multimedia collaboration session and which are not. Screen share preview 232 may depict the desktop view of a user sharing the user's screen, or a particular application or presentation. Changes to the user's screen, such as the user advancing to the next slide in a presentation, will automatically be depicted in screen share preview 232. In some examples, the screen share preview 232 may be actuated to cause the screen share preview 232 to be enlarged such that it is displayed as its own pane within the group-based communication system. In some examples, the screen share preview 232 can be actuated to cause the screen share preview 232 to pop out into a new window or application separate and distinct from the group-based communication system. In some examples, the synchronous multimedia collaboration session pane 216 may comprise tools for the synchronous multimedia collaboration session allowing a user to mute the user's microphone or invite other users. In some examples, the synchronous multimedia collaboration session pane 216 may comprise a screen share button 234 that may permit a user to share the user's screen with other members of the synchronous multimedia collaboration session pane 216. In some examples, the screen share button 234 may provide a user with additional controls during a screen share. For example, a user sharing the user's screen may be provided with additional screen share controls to specify which screen to share, to annotate the shared screen, or to save the shared screen.

In some cases, the synchronous multimedia collaboration session pane 216 may persist in the navigation pane 206 regardless of the state of the group-based communication system. In some examples, when no synchronous multimedia collaboration session is active and/or depending on which item is selected from the navigation pane 206, the synchronous multimedia collaboration session pane 216 may be hidden or removed from being presented via the user interface 200. In some instances, when the pane 216 is active, the pane 216 can be associated with a currently selected channel, direct message, or multi-person direct message such that a synchronous multimedia collaboration session may be initiated and associated with the currently selected channel, direct message, or multi-person direct message.

A list of synchronous multimedia collaboration sessions may include one or more active synchronous multimedia collaboration sessions selected for recommendation. For example, the synchronous multimedia collaboration sessions may be selected from a plurality of currently active synchronous multimedia collaboration sessions. Further, the synchronous multimedia collaboration sessions may be selected based in part on user interaction with the sessions or some association of the instant user with the sessions or users involved in the sessions. For example, the recommended synchronous multimedia collaboration sessions may be displayed based in part on the instant user having been invited to a respective synchronous multimedia collaboration session or having previously collaborated with the users in the recommended synchronous multimedia collaboration session. In some examples, the list of synchronous multimedia collaboration sessions further includes additional information for each respective synchronous multimedia collaboration session, such as an indication of the participating users or number of participating users, a topic for the synchronous multimedia collaboration session, and/or an indication of an associated group-based communication channel, multi-person direct message conversation, or direct message conversation.

In some examples, a list of recommended active users may include a plurality of group-based communication system users recommended based on at least one of user activity, user interaction, or other user information. For example, the list of recommended active users may be selected based on an active status of the users within the group-based communication system; historic, recent, or frequent user interaction with the instant user (such as communicating within the group-based communication channel); or similarity between the recommended users and the instant user (such as determining that a recommended user shares common membership in channels with the instant user). In some examples, machine learning techniques such as cluster analysis can be used to determine recommended users. The list of recommended active users may include status user information for each recommended user, such as whether the recommended user is active, in a meeting, idle, in a synchronous multimedia collaboration session, or offline. In some examples, the list of recommended active users further comprises a plurality of actuatable buttons corresponding to some of or all the recommended users (for example, those recommended users with a status indicating availability) that, when selected, may be configured to initiate at least one of a text-based communication session (such as a direct message conversation) or a synchronous multimedia collaboration session.

In some examples, one or more recommended asynchronous multimedia collaboration sessions or meetings can be displayed in an asynchronous meeting section. By contrast with a synchronous multimedia collaboration session (described above), an asynchronous multimedia collaboration session allows each participant to collaborate at a time convenient to them. This collaboration participation is then recorded for later consumption by other participants, who can generate additional multimedia replies. In some examples, the replies are aggregated in a multimedia thread (for example, a video thread) corresponding to the asynchronous multimedia collaboration session. For example, an asynchronous multimedia collaboration session may be used for an asynchronous meeting where a topic is posted in a message at the beginning of a meeting thread and participants of the meeting may reply by posting a message or a video response. The resulting thread then comprises any documents, video, or other files related to the asynchronous meeting. In some examples, a preview of a subset of video replies may be shown in the asynchronous collaboration session or thread. This can allow, for example, a user to jump to a relevant segment of the asynchronous multimedia collaboration session or to pick up where they left off previously.

Connecting Within the Group-Based Communication System

Figure 2C:
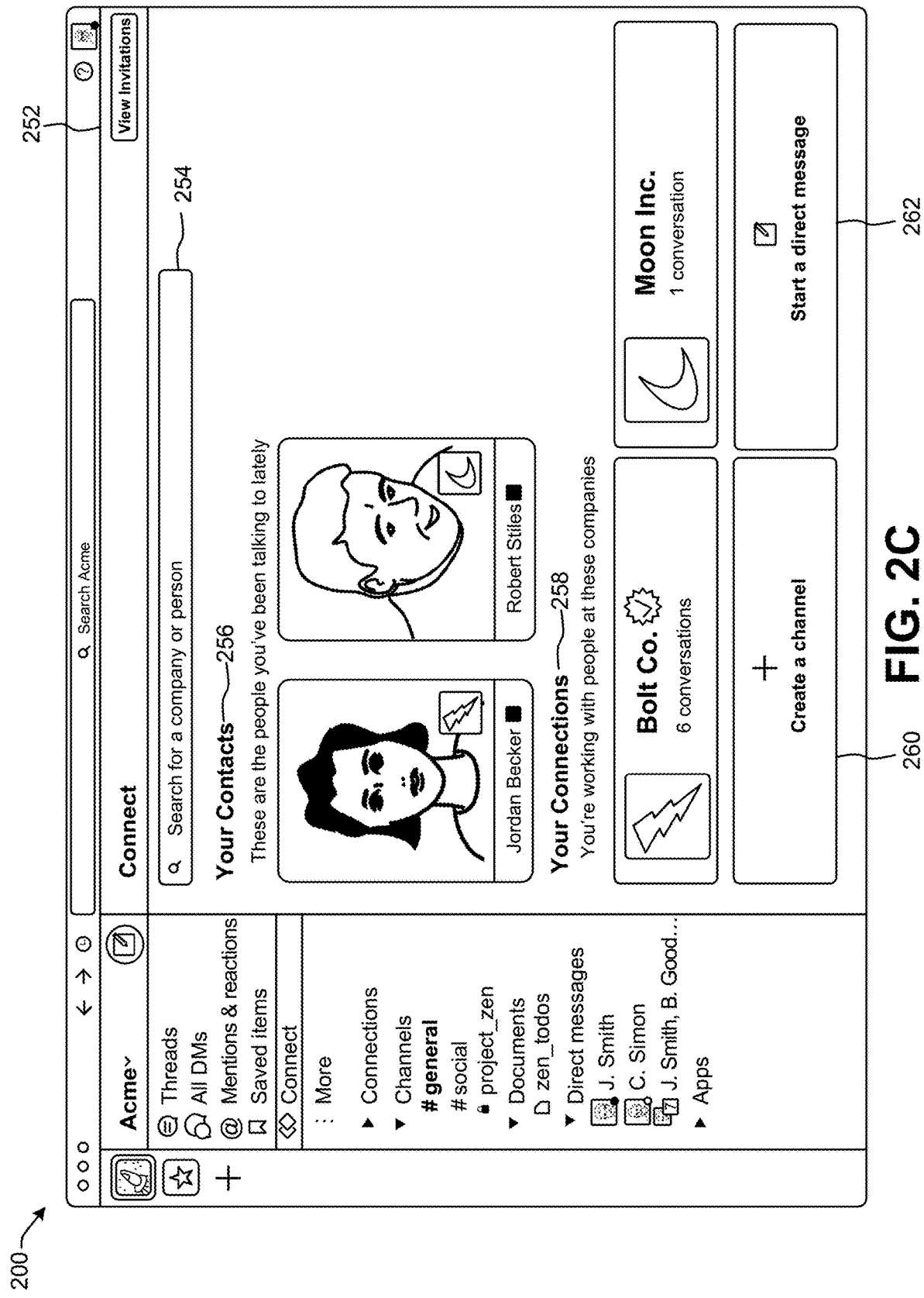
FIG. 2C illustrates a user interface for inter-organization collaboration within the group-based communication system for certain examples.

FIG. 2C illustrates user interface 200 displaying a connect pane 252. The connect pane 252 may provide tools and resources for users to connect across different organizations, where each organization may have their own (normally private) instance of the group-based communication system or may not yet belong to the group-based communication system. For example, a first software company may have a joint venture with a second software company with whom they wish to collaborate on jointly developing a new software application. The connect pane 252 may enable users to determine which other users and organizations are already within the group-based communication system, and to invite those users and organizations currently outside of the group-based communication system to join.

The connect pane 252 may comprise a connect search bar 254, recent contacts 256, connections 258, a create channel button 260, and/or a start direct message button 262. In some examples, the connect search bar 254 may permit a user to search for users within the group-based communication system. In some examples, only users from organizations that have connected with the user's organization will be shown in the search results. In other examples, users from any organization that uses the group-based communication system can be displayed. In still other examples, users from organizations that do not yet use the group-based communication can also be displayed, allowing the searching user to invite them to join the group-based communication system. In some examples, users can be searched for via their group-based communication system username or their email address. In some examples, email addresses may be suggested or autocompleted based on external sources of data such as email directories or the searching user's contact list.

In some examples, external organizations as well as individual users may be shown in response to a user search. External organizations may be matched based on an organization name or internet domain, as search results may include organizations that have not yet joined the group-based communication system (similar to searching and matching for a particular user, discussed above). External organizations may be ranked based in part on how many users from the user's organization have connected with users of the external organization. Responsive to a selection of an external organization in a search result, the searching user may be able to invite the external organization to connect via the group-based communication system.

In some examples, the recent contacts 256 may display users with whom the instant user has recently interacted. The recent contacts 256 may display the user's name, company, and/or a status indication. The recent contacts 256 may be ordered based on which contacts the instant user most frequently interacts with or based on the contacts with whom the instant user most recently interacted. In some examples each recent contact of the recent contacts 256 may be an actuatable control allowing the instant user to quickly start a direct message conversation with the recent contact, invite them to a channel, or take any other appropriate user action for that recent contact.

In some examples, the connections 258 may display a list of companies (e.g., organizations) with which the user has interacted. For each company, the name of the company may be displayed along with the company's logo and an indication of how many interactions the user has had with the company, for example the number of conversations. In some examples, each connection of the connections 258 may be an actuatable control allowing the instant user to quickly invite the external organization to a shared channel, display recent connections with that external organization, or take any other appropriate organization action for that connection.

In some examples, the create channel button 260 allows a user to create a new shared channel between two different organizations. Selecting the create channel button 260 may further allow a user to name the new connect channel and enter a description for the connect channel. In some examples, the user may select one or more external organizations or one or more external users to add to the shared channel. In other examples, the user may add external organizations or external users to the shared channel after the shared channel is created. In some examples, the user may elect whether to make the connect channel private (e.g., accessible only by invitation from a current member of the private channel).

In some examples, the start direct message button 262 allows a user to quickly start a direct message (or multi-person direct message) with external users at an external organization. In some examples, the external user identifier at an external organization may be supplied by the instant user as the external user's group-based communication system username or as the external user's email address. In some examples, an analysis of the email domain of the external user's email address may affect the message between the user and the external user. For example, the external user's identifier may indicate (for example, based on an email address domain) that the user's organization and the external user's organization are already connected. In some such examples, the email address may be converted to a group-based communication system username.

Alternatively, the external user's identifier may indicate that the external user's organization belongs to the group-based communication system but is not connected to the instant user's organization. In some such examples, an invitation to connect to the instant user's organization may be generated in response. As another alternative, the external user may not be a member of the group-based communication system, and an invitation to join the group-based communication system as a guest or a member may be generated in response.

Collaborative Documents

Figure 2D:
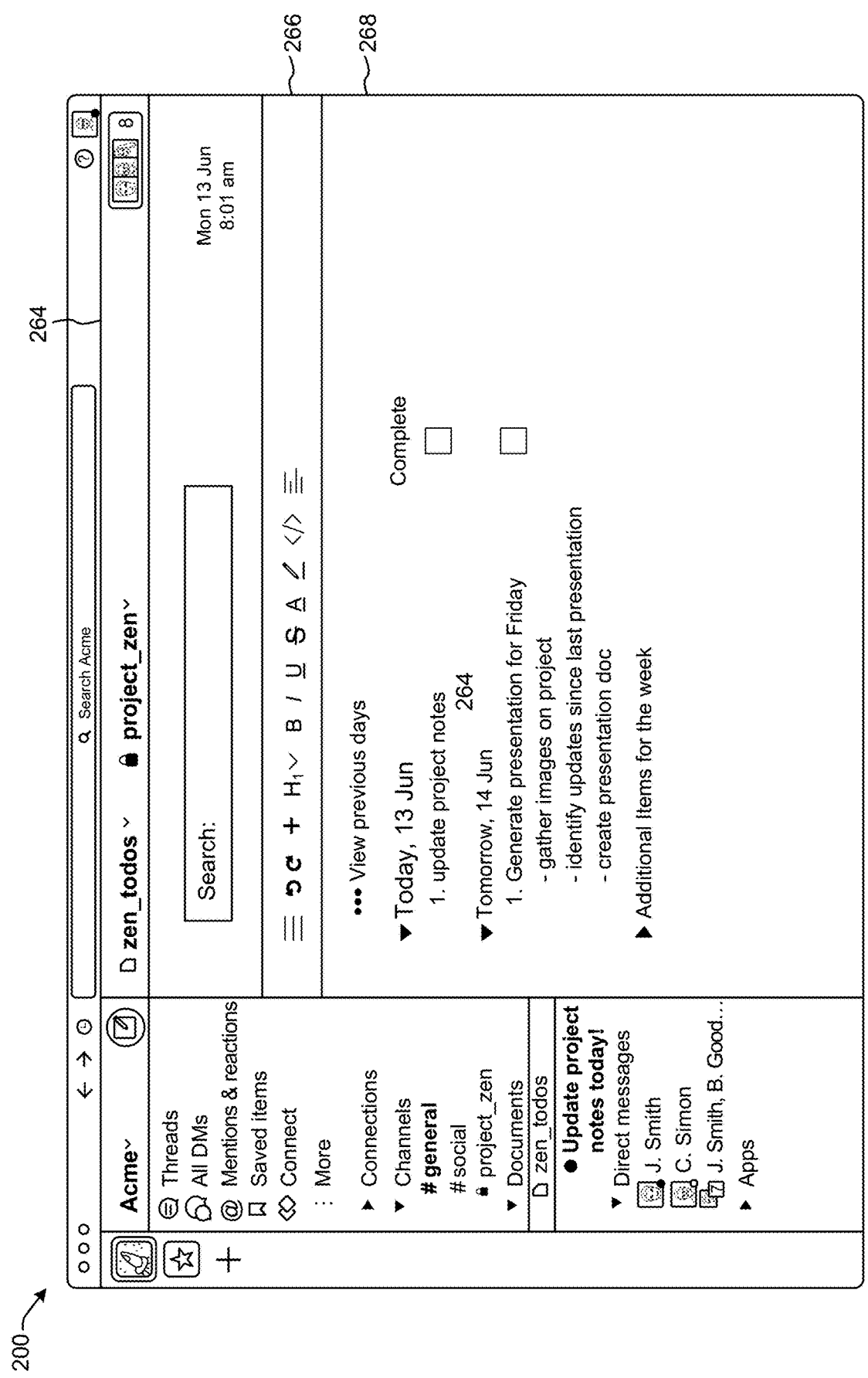
FIG. 2D illustrates a user interface for collaborative documents within the group-based communication system for certain examples.

FIG. 2D illustrates user interface 200 displaying a collaboration document pane 264. A collaborative document may be any file type, such as a PDF, video, audio, word processing document, etc., and is not limited to a word processing document or a spreadsheet. A collaborative document may be modified and edited by two or more users. A collaborative document may also be associated with different user permissions, such that based on a user's permissions for the document (or sections of the document as discussed below), the user may selectively be permitted to view, edit, or comment on the collaborative document (or sections of the collaborative document). As such, users within the set of users having access to the document may have varying permissions for viewing, editing, commenting, or otherwise interfacing with the collaborative document. In some examples, permissions can be determined and/or assigned automatically based on how document(s) are created and/or shared. In some examples, permission can be determined manually. Collaborative documents may allow users to simultaneously or asynchronously create and modify documents. Collaborative documents may integrate with the group-based communication system and can both initiate workflows and be used to store the results of workflows, which are discussed further below with respect to FIGS. 3A and 3B.

In some examples, the user interface 200 can comprise one or more collaborative documents (or one or more links to such collaborative documents). A collaborative document (also referred to as a document or canvas) can include a flexible workspace for curating, organizing, and sharing collections of information between users. Such documents may be associated with a synchronous multimedia collaboration session, an asynchronous multimedia collaboration session, a channel, a multi-person direct message conversation, and/or a direct message conversation. Shared canvases can be configured to be accessed and/or modified by two or more users with appropriate permissions. Alternatively or in addition, a user might have one or more private documents that are not associated with any other users.

Further, such documents can be @mentioned, such that particular documents can be referred to within channels (or other virtual spaces or documents) and/or other users can be @mentioned within such a document. For example, @mentioning a user within a document can provide an indication to that user and/or can provide access to the document to the user. In some examples, tasks can be assigned to a user via an @mention and such task(s) can be populated in the pane or sidebar associated with that user.

In some examples, a channel and a collaborative document 268 can be associated such that when a comment is posted in a channel it can be populated to a document 268, and vice versa.

In some examples, when a first user interacts with a collaborative document, the communication platform can identify a second user account associated with the collaborative document and present an affordance (e.g., a graphical element) in a sidebar (e.g., the navigation pane 206) indicative of the interaction. Further, the second user can select the affordance and/or a notification associated with or representing the interaction to access the collaborative document, to efficiently access the document and view the update thereto.

In some examples, as one or more users interact with a collaborative document, an indication (e.g., an icon or other user interface element) can be presented via user interfaces with the collaborative document to represent such interactions. For examples, if a first instance of the document is presently open on a first user computing device of a first user, and a second instance of the document is presently open on a second user computing device of a second user, one or more presence indicators can be presented on the respective user interfaces to illustrate various interactions with the document and by which user. In some examples, a presence indicator may have attributes (e.g., appearance attributes) that indicate information about a respective user, such as, but not limited to, a permission level (e.g., edit permissions, read-only access, etc.), virtual-space membership (e.g., whether the member belongs to a virtual space associated with the document), and the manner in which the user is interacting with the document (e.g., currently editing, viewing, open but not active, etc.).

In some examples, a preview of a collaborative document can be provided. In some examples, a preview can comprise a summary of the collaborative document and/or a dynamic preview that displays a variety of content (e.g., as changing text, images, etc.) to allow a user to quickly understand the context of a document. In some examples, a preview can be based on user profile data associated with the user viewing the preview (e.g., permissions associated with the user, content viewed, edited, created, etc. by the user), and the like.

In some examples, a collaborative document can be created independent of or in connection with a virtual space and/or a channel. A collaborative document can be posted in a channel and edited or interacted with as discussed herein, with various affordances or notifications indicating presence of users associated with documents and/or various interactions.

In some examples, a machine learning model can be used to determine a summary of contents of a channel and can create a collaborative document comprising the summary for posting in the channel. In some examples, the communication platform may identify the users within the virtual space, actions associated with the users, and other contributions to the conversation to generate the summary document. As such, the communication platform can enable users to create a document (e.g., a collaborative document) for summarizing content and events that transpired within the virtual space.

In some examples, documents can be configured to enable sharing of content including (but not limited to) text, images, videos, GIFs, drawings (e.g., user-generated drawings via a drawing interface), or gaming content. In some examples, users accessing a canvas can add new content or delete (or modify) content previously added. In some examples, appropriate permissions may be required for a user to add content or to delete or modify content added by a different user. Thus, for example, some users may only be able to access some or all of a document in view-only mode, while other users may be able to access some or all of the document in an edit mode allowing those users to add or modify its contents. In some examples, a document can be shared via a message in a channel, multi-person direct message, or direct message, such that data associated with the document is accessible to and/or rendered interactable for members of the channel or recipients of the multi-person direct message or direct message.

In some examples, the collaboration document pane 264 may comprise collaborative document toolbar 266 and collaborative document 268. In some examples, collaborative document toolbar 266 may provide the ability to edit or format posts, as discussed herein.

In some examples, collaborative documents may comprise free-form unstructured sections and workflow-related structured sections. In some examples, unstructured sections may include areas of the document in which a user can freely modify the collaborative document without any constraints. For example, a user may be able to freely type text to explain the purpose of the document. In some examples, a user may add a workflow or a structured workflow section by typing the name of (or otherwise mentioning) the workflow. In further examples, typing the "at" sign (@), a previously selected symbol, or a predetermined special character or symbol may provide the user with a list of workflows the user can select to add to the document. For example, a user may indicate that a marketing team member needs to sign off on a proposal by typing "!Marketing Approval" to initiate a workflow that culminates in a member of the marketing team approving the proposal. Placement of an exclamation point prior to the group name of "Marketing Approval" initiates a request for a specification action, in this case routing the proposal for approval. In some examples, structured sections may include text entry, selection menus, tables, checkboxes, tasks, calendar events, or any other document section. In further examples, structured sections may include text entry spaces that are a part of a workflow. For example, a user may enter text into a text entry space detailing a reason for approval, and then select a submit button that will advance the workflow to the next step of the workflow. In some examples, the user may be able to add, edit, or remove structured sections of the document that make up the workflow components.

In examples, sections of the collaborative document may have individual permissions associated with them. For example, a collaborative document having sections with individual permissions may provide a first user permission to view, edit, or comment on a first section, while a second user does not have permission to view, edit, or comment on the first section. Alternatively, a first user may have permissions to view a first section of the collaborative document, while a second user has permissions to both view and edit the first section of the collaborative document. The permissions associated with a particular section of the document may be assigned by a first user via various methods, including manual selection of the particular section of the document by the first user or another user with permission to assign permissions, typing or selecting an "assignment" indicator, such as the "@" symbol, or selecting the section by a name of the section. In further examples, permissions can be assigned for a plurality of collaborative documents at a single instance via these methods. For example, a plurality of collaborative documents each has a section entitled "Group Information," where the first user with permission to assign permissions desires an entire user group to have access to the information in the "Group Information" section of the plurality of collaborative documents. In examples, the first user can select the plurality of collaborative documents and the "Group Information" section to effectuate permissions to access (or view, edit, etc.) to the entire user group the "Group Information" section of each of the plurality of collaborative documents.

Automation in the Group-Based Communication System

Figure 3A:
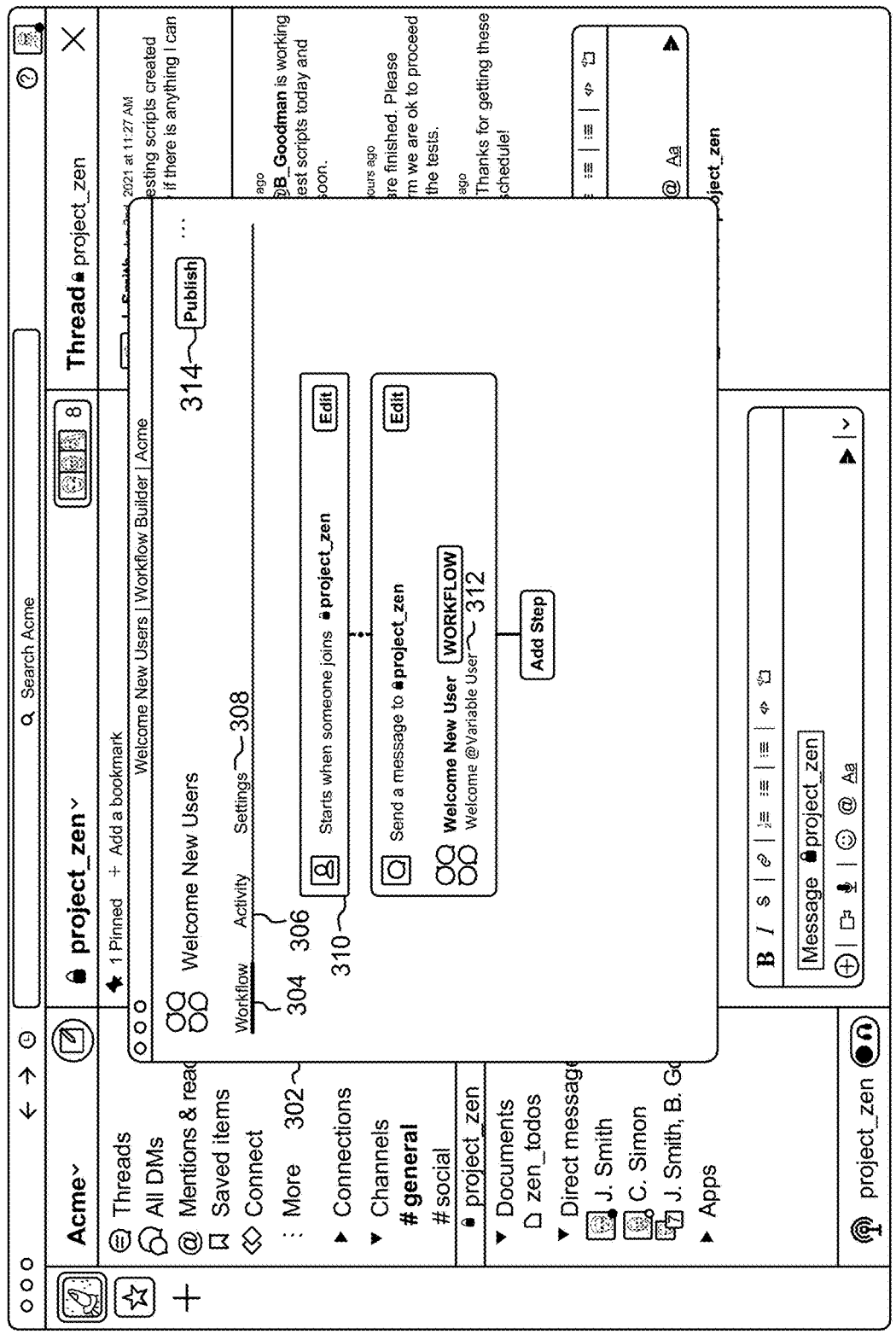
FIG. 3A depicts a user interface for workflows within a group-based communication system.

FIG. 3A illustrates user interface 300 for automation in the group-based communication system. Automation, also referred to as workflows, allow users to automate functionality within the group-based communication system. Workflow builder 302 is depicted which allows a user to create new workflows, modify existing workflows, and review the workflow activity. Workflow builder 302 may comprise a workflow tab 304, an activity tab 306, and/or a settings tab 308. In some examples, workflow builder may include a publish button 314 which permits a user to publish a new or modified workflow.

The workflow tab 304 may be selected to enable a user to create a new workflow or to modify an existing workflow. For example, a user may wish to create a workflow to automatically welcome new users who join a channel. A workflow may comprise workflow steps 310. Workflow steps 310 may comprise at least one trigger which initiates the workflow and at least one function which takes an action once the workflow is triggered. For example, a workflow may be triggered when a user joins a channel and a function of the workflow may be to post within the channel welcoming the new user. In some examples, workflows may be triggered from a user action, such as a user reacting to a message, joining a channel, or collaborating in a collaborative document, from a scheduled date and time, or from a web request from a third-party application or service. In further examples, workflow functionality may include sending messages or forms to users, channels, or any other virtual space, modifying collaborative documents, or interfacing with applications. Workflow functionality may include workflow variables 312. For example, a welcome message may include a user's name via a variable to allow for a customized message. Users may edit existing workflow steps or add new workflow steps depending on the desired workflow functionality. Once a workflow is complete, a user may publish the workflow using publish button 314. A published workflow will wait until it is triggered, at which point the functions will be executed.

Activity tab 306 may display information related to a workflow's activity. In some examples, the activity tab 306 may show how many times a workflow has been executed. In further examples, the activity tab 306 may include information related to each workflow execution including the status, last activity date, time of execution, user who initiated the workflow, and other relevant information. The activity tab 306 may permit a user to sort and filter the workflow activity to find useful information.

A settings tab 308 may permit a user to modify the settings of a workflow. In some examples, a user may change a title or an icon associated with the workflow. Users may also manage the collaborators associated with a workflow. For example, a user may add additional users to a workflow as collaborators such that the additional users can modify the workflow. In some examples, settings tab 308 may also permit a user to delete a workflow.

Figure 3B:
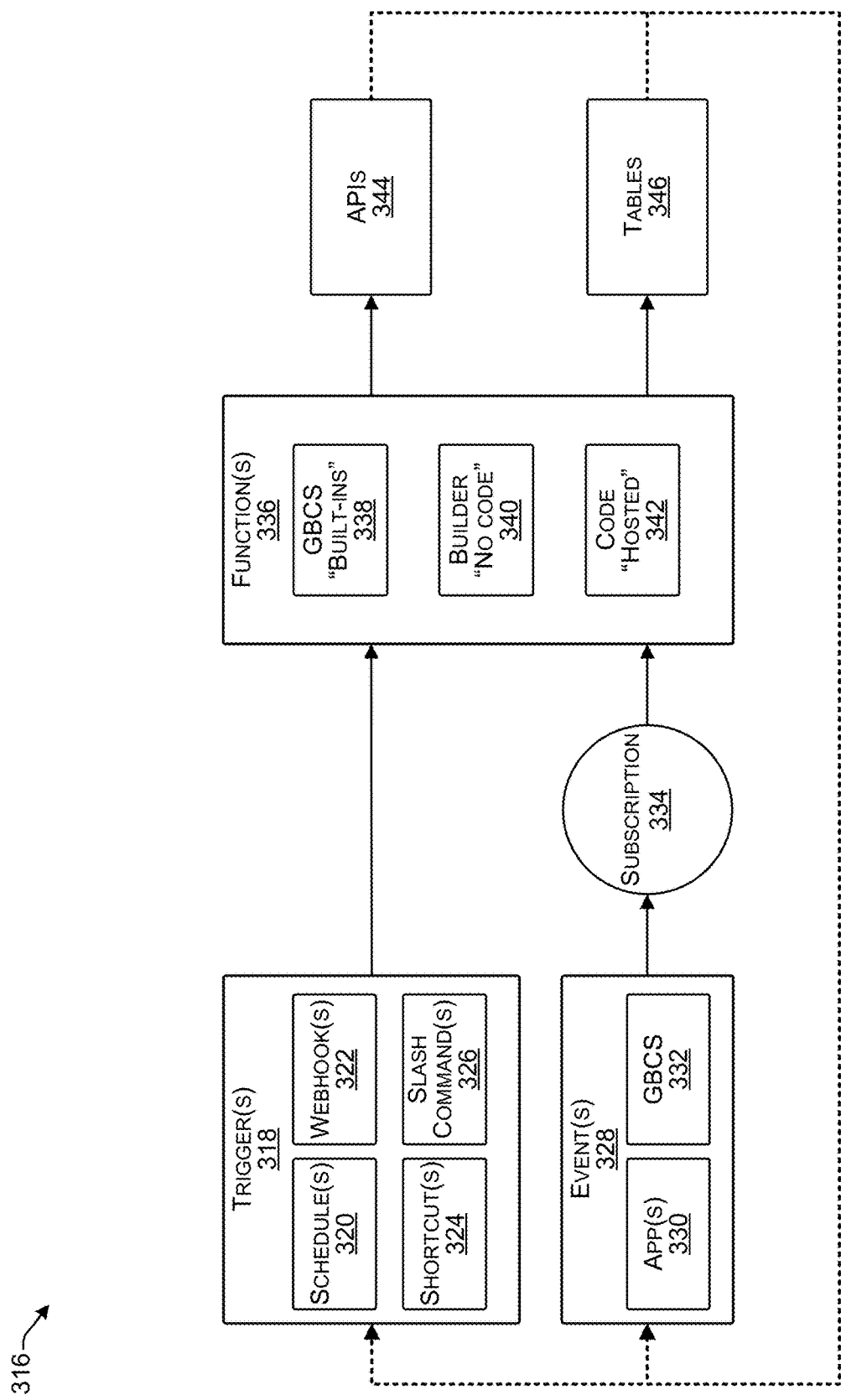
FIG. 3B depicts a block diagram for carrying out certain examples, as discussed herein.

FIG. 3B depicts elements related to workflows in the group-based communication system and is referred to generally by reference numeral 316. In various examples, trigger(s) 318 can be configured to invoke execution of function(s) 336 responsive to user instructions. A trigger initiates function execution and may take the form of one or more schedule(s) 320, webhook(s) 322, shortcut(s) 324, and/or slash command(s) 326. In some examples, the schedule 320 operates like a timer so that a trigger may be scheduled to fire periodically or once at a predetermined point in the future. In some examples, an end user of an event-based application sets an arbitrary schedule for the firing of a trigger, such as once-an-hour or every day at 9:15 AM.

Additionally, triggers 318 may take the form of the webhook 322. The webhook 322 may be a software component that listens at a webhook URL and port. In some examples, a trigger fires when an appropriate HTTP request is received at the webhook URL and port. In some examples, the webhook 322 requires proper authentication such as by way of a bearer token. In other examples, triggering will be dependent on payload content.

Another source of one of the trigger(s) 318 is a shortcut in the shortcut(s) 324. In some examples, the shortcut(s) 324 may be global to a group-based communication system and are not specific to a group-based communication system channel or workspace. Global shortcuts may trigger functions that are able to execute without the context of a particular group-based communication system message or group-based communication channel. By contrast, message- or channel-based shortcuts are specific to a group-based communication system message or channel and operate in the context of the group-based communication system message or group-based communication channel.

A further source of one of triggers 318 may be provided by way of slash commands 326. In some examples, the slash command(s) 326 may serve as entry points for group-based communication system functions, integrations with external services, or group-based communication system message responses. In some examples, the slash commands 326 may be entered by a user of a group-based communication system to trigger execution of application functionality. Slash commands may be followed by slash-command-line parameters that may be passed along to any group-based communication system function that is invoked in connection with the triggering of a group-based communication system function such as one of functions 336.

An additional way in which a function is invoked is when an event (such as one of events 328) matches one or more conditions as predetermined in a subscription (such as subscription 334). Events 328 may be subscribed to by any number of subscriptions 334, and each subscription may specify different conditions and trigger a different function. In some examples, events are implemented as group-based communication system messages that are received in one or more group-based communication system channels. For example, all events may be posted as non-user visible messages in an associated channel, which is monitored by subscriptions 334. App events 330 may be group-based communication system messages with associated metadata that are created by an application in a group-based communication system channel. Events 328 may also be direct messages received by one or more group-based communication system users, which may be an actual user or a technical user, such as a bot. A bot is a technical user of a group-based communication system that is used to automate tasks. A bot may be controlled programmatically to perform various functions. A bot may monitor and help process group-based communication system channel activity as well as post messages in group-based communication system channels and react to members' in-channel activity. Bots may be able to post messages and upload files as well as be invited or removed from both public and private channels in a group-based communication system.

Events 328 may also be any event associated with a group-based communication system. Such group-based communication system events 332 include events relating to the creation, modification, or deletion of a user account in a group-based communication system or events relating to messages in a group-based communication system channel, such as creating a message, editing or deleting a message, or reacting to a message. Events 328 may also relate to creation, modification, or deletion of a group-based communication system channel or the membership of a channel. Events 328 may also relate to user profile modification or group creation, member maintenance, or group deletion.

As described above, subscription 334 indicates one or more conditions that, when matched by events, trigger a function. In some examples, a set of event subscriptions is maintained in connection with a group-based communication system such that when an event occurs, information regarding the event is matched against a set of subscriptions to determine which (if any) of functions 336 should be invoked. In some examples, the events to which a particular application may subscribe are governed by an authorization framework. In some instances, the event types matched against subscriptions are governed by OAuth permission scopes that may be maintained by an administrator of a particular group-based communication system.

In some examples, functions 336 can be triggered by triggers 318 and events 328 to which the function is subscribed. Functions 336 take zero or more inputs, perform processing (potentially including accessing external resources), and return zero or more results. Functions 336 may be implemented in various forms. First, there are group-based communication system built-ins 338, which are associated with the core functionality of a particular group-based communication system. Some examples include creating a group-based communication system user or channel. Second are no-code builder functions 340 that may be developed by a user of a group-based communication system user in connection with an automation user interface such as workflow builder user interface. Third, there are hosted-code functions 342 that are implemented by way of group-based communication system applications developed as software code in connection with a software development environment.

These various types of functions 336 may in turn integrate with APIs 344. In some examples, APIs 344 are associated with third-party services that functions 336 employ to provide a custom integration between a particular third-party service and a group-based communication system. Examples of third-party service integrations include video conferencing, sales, marketing, customer service, project management, and engineering application integration. In such an example, one of the triggers 318 would be a slash command 326 that is used to trigger a hosted-code function 342, which makes an API call to a third-party video conferencing provider by way of one of the APIs 344. As shown in FIG. 3B, the APIs 344 may themselves also become a source of any number of triggers 318 or events 328. Continuing the above example, successful completion of a video conference would trigger one of the functions 336 that sends a message initiating a further API call to the third-party video conference provider to download and archive a recording of the video conference and store it in a group-based communication system channel.

In addition to integrating with APIs 344, functions 336 may persist and access data in tables 346. In some examples, tables 346 are implemented in connection with a database environment associated with a serverless execution environment in which a particular event-based application is executing. In some instances, tables 346 may be provided in connection with a relational database environment. In other examples, tables 346 are provided in connection with a database mechanism that does not employ relational database techniques. As shown in FIG. 3B, in some examples, reading or writing certain data to one or more of tables 346, or data in table matching predefined conditions, is itself a source of some number of triggers 318 or events 328. For example, if tables 346 are used to maintain ticketing data in an incident-management system, then a count of open tickets exceeding a predetermined threshold may trigger a message being posted in an incident-management channel in the group-based communication system.

Figure 4:
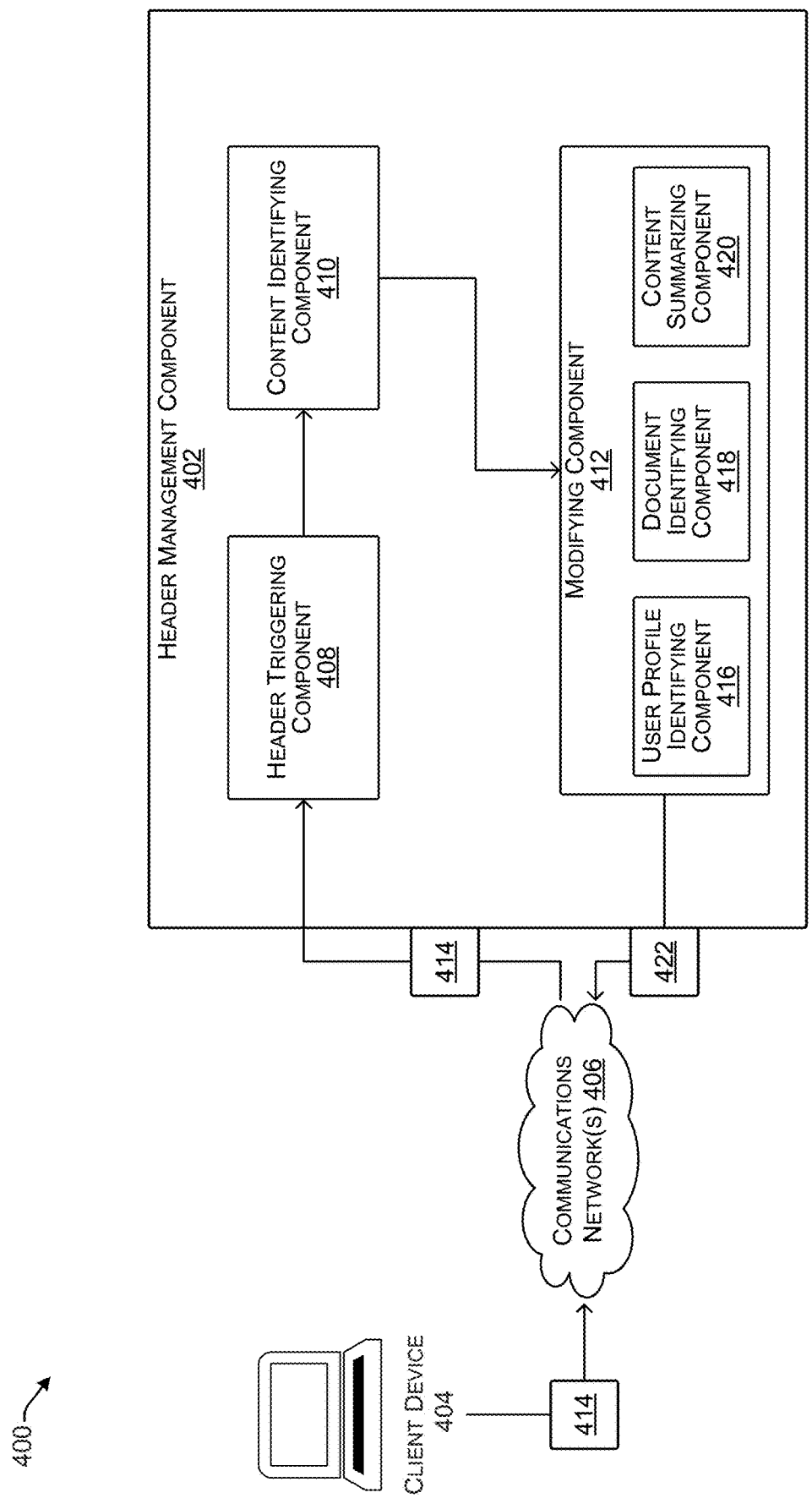
FIG. 4 depicts a block diagram illustrating the interactions of components between a header management component configured to update headers within a virtual space.

FIG. 4 depicts a block diagram 400 illustrating the interactions of components between a header management component 402 configured to update headers within a virtual space.

In some examples, the example block diagram 400 may be implemented with and/or in conjunction with a group-based communication platform (or a sales-based platform). In this example, the example, block diagram 400 may include one or more client devices 404 configured to communicate with a communication platform via a communication network 406. Additionally, the example block diagram 400 may include a header management component 402 configured to generate, update, and/or modify the content within a header associated with a canvas. The header management component 402 may include a header triggering component 408 configured to determine whether to update the content within a header, a content identifying component 410 configured to identify data (or content) to evaluate when performing the header modifying operation, and/or a modifying component 412 configured to generate updated content to be associated with and/or displayed within a header.

In some examples, the example block diagram 400 may include one or more client devices 404 configured to communicate with a communication platform. The example block diagram 400 includes a client device 404. In this example, the client device 404 may be a laptop; however, in other examples, the client device 404 may be any fixed computing device, such as a personal computer or a computer workstation, or any of a variety of mobile devices, such as a portable digital assistant, mobile telephone, smartphone, laptop computer, tablet computer, wearable devices, watch, or any combination of the aforementioned devices. In this example, the client device 404 may communicate with the header management component 402 via the communication network 406, as described in FIG. 1.

In some examples, the header management component 402 may include a header triggering component 408 configured to determine whether to update the content within a header. That is, the header triggering component 408 may be configured to determine that a header of the canvas is to be updated and send one or more instructions to the one or more components of the header management component 402 to generate, update, and/or modify the content within a header. The header triggering component 408 may determine that a header is to be updated based on receiving a request from a user profile or by the satisfying of a condition. For example, a user profile associated with the user device 404 may interact with the virtual space within which the headers are displayed. In such instances, the headers may include an actionable user interface element enabling, upon selection, the user profile to send a request 414 to the header triggering component 408. In such instances, the request 414 may include instructions to update, modify, or generate a specific header. As such, upon receiving the request from the user profile, the header triggering component 408 may send instructions to one or more components of the header management component 402 to update the content within a header.

Additionally of alternatively, the header triggering component 408 may set one or more conditions that, upon being satisfied, may cause the header triggering component 408 to instruct one or more components of the header management component 402 to update the content within a header. That is, a condition may be set according to a predefined frequency, such as once a day at a specific time, twice a day at a specific time, once a week at a specific time, once a month at a specific time, etc. For example, the header triggering component 408 may set a condition (or temporal condition) at 12:00 pm on the first day of each month. As such, at 12:00 pm on the first day of each month, the condition may be satisfied and the header triggering component 408 may instruct component(s) of the header management component 402 to update a header. However, this is not intended to be limiting; in other examples, the temporal condition may be set at any other frequency.

In some examples, the header management component 402 may include a content identifying component 410 configured to identify data (or content) to evaluate when performing the header modifying operation. That is, the content identifying component 410 may receive instruction(s) from the header triggering component 408 to update the content within a header. In such instances, the content identifying component 410 may identify the type of header to update by analyzing the request 414 or identifying which of the headers the satisfied condition corresponded to. The request 414 may include a header identifier which may be associated with the header the user profile is requesting to update. In such instances, the header identifier may be mapped to a type of modification operation. For instance, the summary header may be mapped to a summarizing operation. Accordingly, based on identifying the type of modification operation to perform, the content identifying component 410 may retrieve, identify, or otherwise receive certain types of data from the virtual space (e.g., channel, direct messaging instance, etc.) associated with the canvas. For example, if the modification operation is a summarizing operation, the content identifying component 410 may retrieve some or all types of data (e.g., message data, file data, event data, etc.) within the virtual space. If the modification operation is to update the list of important documents, the content identifying component 410 may retrieve some or all files and/or documents and the data associated thereto (e.g., access logs, modification logs, temporal data, etc.). Upon identifying the content on which the modification operation is to perform, the content identifying component 410 may send the content to the modifying component 412.

In some examples, the header management component 402 may include a modifying component 412 configured to generate updated content 422 to be associated with and/or displayed within a header. That is, the modifying component 412 may leverage one or more machine-learning models to update the content within a header. As shown, the modifying component 412 may include one or more subcomponents such as a user profile identifying component 416, a document identifying component 418, and/or a content summarizing component 420. The user profile identifying component 416 may be configured to update the list of sufficiently active user profiles within the virtual space. In such cases, the user profile identifying component 416 may input the content retrieved by the content identifying component 410 into a machine-learning model trained to output updated content 422. The document identifying component 418 may be configured to update the list of highly important documents within the virtual space. In such cases, the document identifying component 418 may input the content retrieved by the content identifying component 410 into a machine-learning model trained to output updated content 422. The content summarizing component 420 may be configured to summarize the conversations being held within the virtual space, summarizing the purpose of the virtual space, summarizing the recent events within the virtual space, etc. In such cases, the content summarizing component 420 may input the content retrieved by the content identifying component 410 into a machine-learning model trained to output updated content 422. Based on receiving the updated content 422 from the machine-learning model, the header management component 402 may cause the updated content 422 to be displayed to the client device 404 such that the user profile (as well as all other user profiles associated with the virtual space) may view the updated content 422 within the header.

Figure 5:
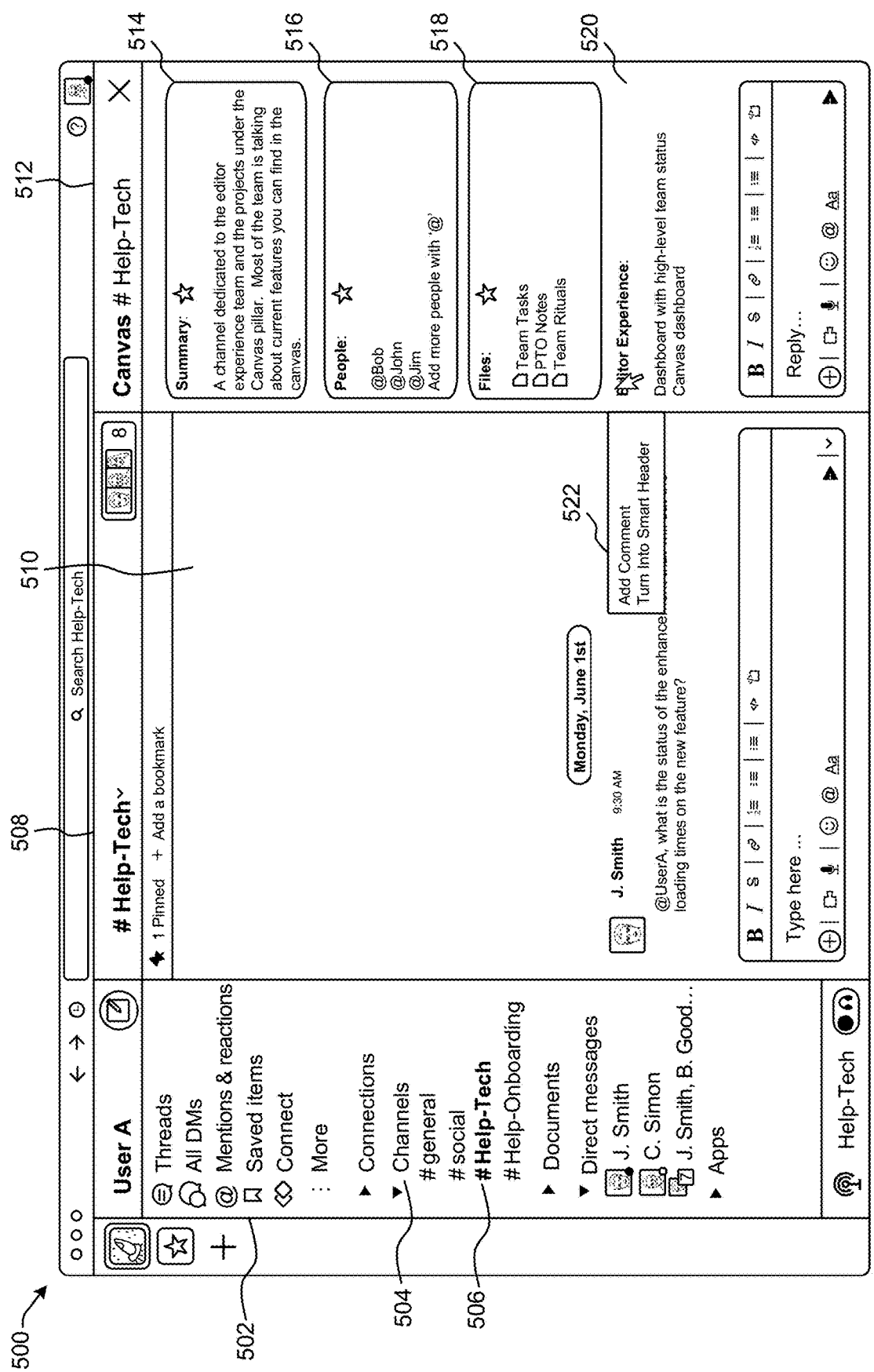
FIG. 5 illustrates an example user interface associated with a communication platform for enabling a user to engage a machine-learning model to create and/or maintain information presented in a header of virtual space.

FIG. 5 illustrates an example user interface 500 associated with a communication platform for enabling a user to engage a machine-learning model to create and/or maintain information presented in a header of virtual space.

In some examples, the example user interface 500 may be similar or identical to the example user interfaces of FIGS. 1-4. As described below, the example user interface 500 may include one or more headers capable of being updated based on a machine-learning model. In some examples, the example user interface 500 may include a navigation pane 502. As described above, the navigation pane 502 may present different data and/or options to a user. In some examples, the navigation pane 502 may include different graphical indicators which may be associated with a variety of virtual spaces, such as channels 504. The example user interface 500 may include any number of channels 504 which may be used to organize conversations between and amongst users according to topics. In some examples, the example user interface 500 may include channels 504 such as a general channel, a social channel, a help-tech channel 506 and/or any other channel. When a user selects a channel 504, a channel pane 508 may be presented. In some examples, the channel pane 508 can include access to content associated with the channel, in addition to enabling users to add other members, post content, and the like.

In some examples, the example user interface 500 may include a message viewing pane 510 to view messages and/or content that have been posted by one or more users associated with the help-tech channel 506. As shown, the user interface 500 may also include a canvas pane 512 containing information specific to help-tech channel 506. That is, the canvas pane 512 may be a virtual space that is associated with the help-tech channel 506. In such cases, the canvas pane 512 may store or otherwise display data unique to the help-tech channel 506. In some examples, the canvas pane 512 may include multiple headers that contain specific information pertaining to the help-tech channel 506. Such headers may be created and/or updated manually or via machine-learning model(s). Specifically, the canvas pane 512 may include a summary header 514 configured to provide a summary about how the users (e.g., members of the channel) are interacting with the help-tech channel 506 and/or about which topics the users are communicating, a people header 516 configured to provide a list of users that are highly active (e.g., number of posts and/or interactions with the virtual space meet or exceed a threshold amount) on the channel, a files header 518 configured to provide a list of highly relevant files (e.g., files that have been accessed, shared, modified, or created within a threshold period of time) to the virtual space, and/or an editor experience header 520 configured to describe the experience of editors and/or administrators.

In some examples, the communication platform may update one or more headers within the canvas pane 512 by engaging one or more machine-learning models. Specifically, the communication platform can update the summary header 514 by inputting some or all content in the message viewing pane 510 (or associated with the help-tech channel 506) into a machine-learning model trained to output a summary of the topics and/or methods of communication found therein. The communication platform may update the people header 516 by inputting administrative data (e.g., membership data) and/or content in the message viewing pane 510 (or associated with the help-tech channel 506) to a machine-learning model trained to identify or otherwise determine a list of one or more highly active users (e.g., based on the interaction data of the user, based on interaction data of the user relative to other users of the virtual space, etc.). The communication platform may update the files header 518 by inputting content in pane 510 (or associated with the help-tech channel 506) to a machine-learning model trained to determine a list of one or more relevant files (e.g., created, accessed, shared, modified within a threshold time, created, accessed, shared, modified a threshold number of times, etc.). In some examples, since the editor experience header 520 is a manual header, the editor experience header 520 may be updated based on manual input provided by a user of the help-tech channel 506.

As an example, a user profile of the help-tech channel 506 may send a request to the communication platform that includes instructions to update the data being displayed within the summary header 514. In this case, the user profile may send the request by selecting (or clicking on) an actionable user interface element that enables the user profile to send instructions to the communication platform. In this situation, the actionable user interface element may be the star icon proximate of the word "summary" in the summary header 514. Upon selecting the star icon, the communication platform may receive a request from the user profile and/or the virtual space to modify the content being displayed within the summary header 514. Based on receiving the request, the communication platform may identify content on which to perform the modifying operation. The communication platform may identify content that is relevant to the modifying operation. In this case, since the modifying operation is to summarize the purpose of the channel, the discussions being held in the channel, etc., the communication platform may retrieve some or all message data, file data, etc. within the help-tech channel 506. Upon identifying the content, the communication platform may input the content and the type of modifying operation (e.g., summarization) into a machine-learning model trained to output second content that has been updated according to the type of modifying operation. In such instances, based on receiving the second content from the machine-learning model, the communication platform may associate the second content with the summary header 514 and/or display the second content within the summary header 514.

In some examples, the communication platform may convert a manually created and/or updated header to a smart header (e.g., updated and/or maintained by a machine-learning model). For example, a user may select a manually created and/or updated header such as the editor experience header 520. In such instances, upon receiving the selection (e.g., request, user input data), the communication platform may render a box 522 containing an option to convert the editor experience header 520 to a smart header that is updated automatically according to a machine-learning model. In such cases, the editor experience header 520 may be updated or otherwise maintained using one or more machine-learning models. Similar to the other headers described herein, the new editor experience header 520 may be updated based on a user profile selecting an actionable user interface element and requesting that the content displayed within the editor experience header 50 be updated. Alternatively, the headers may be updated according to a predetermine frequency. For example, the communication platform may cause the headers to update automatically (e.g., without user profile input or requests) every month, week, day, etc. Further, in some cases, the frequencies at which the headers are updated may be different. That is, in some instances, it may be more important to keep an up to date file header as the files (or documents) displayed therein may change frequently. Whereas the data displayed in the summary header may be accurate for longer periods of time. As such, the communication platform may indicate that the summary header may update automatically once every month while the file header updates automatically once every week.

In some instances, user profiles may manually update and/or modify some or all smart headers or manual headers. That is, members of the help-tech channel 506 may be able to manually input data into headers that use machine-learning models to update. As shown if FIG. 5, the people header 516 may include a portion of the header that recites "add more people with '@'." As such, a user profile of the communication platform may manually add user profiles despite the people header 516 being updated using machine-learning models.

Figure 6:
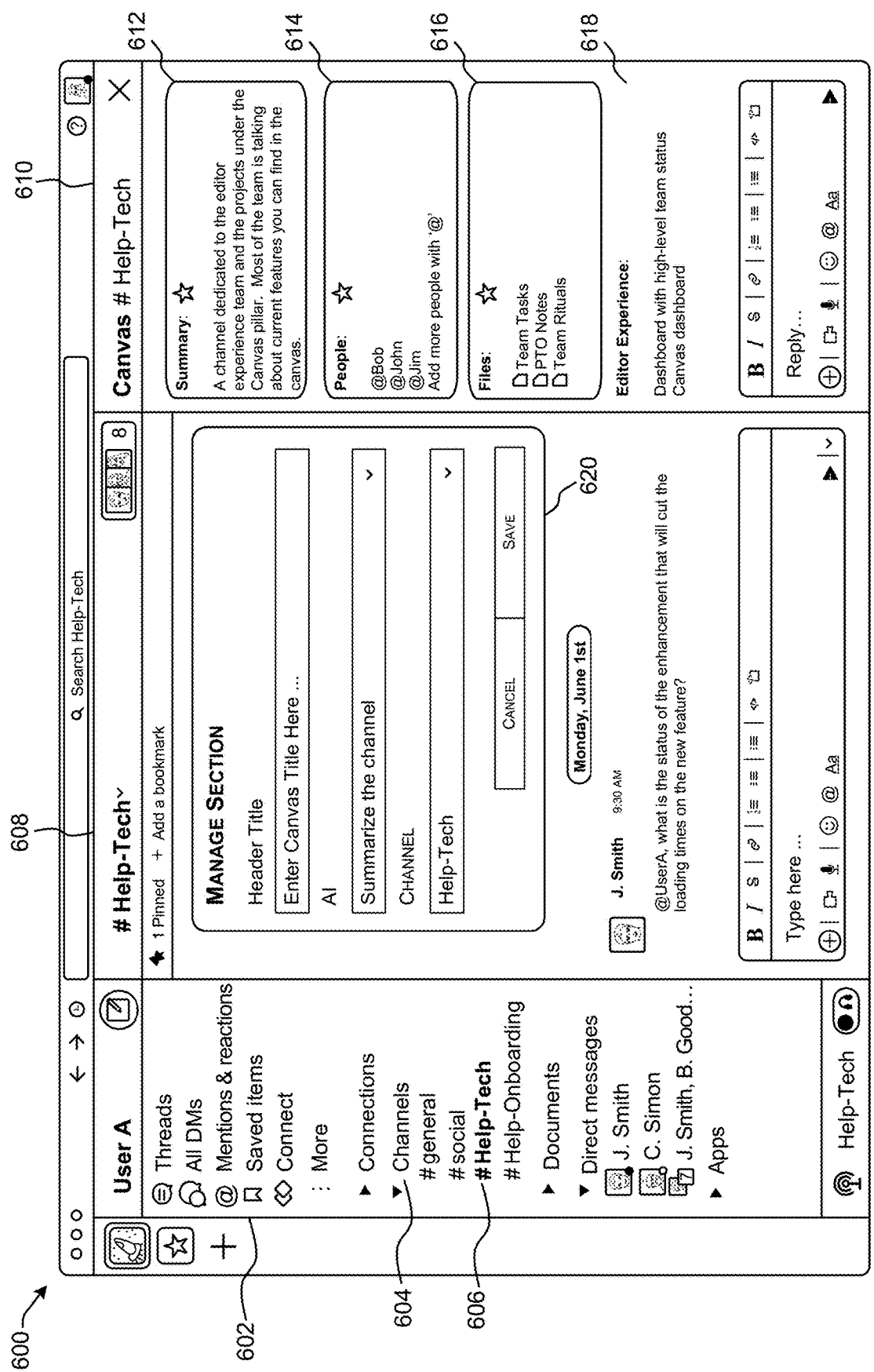
FIG. 6 illustrates an example user interface associated with a communication platform for modifying the setting associated with a header of a virtual space.

FIG. 6 illustrates an example user interface 600 associated with a communication platform for modifying the setting associated with a header of a virtual space.

In some examples, the example user interface 600 may be similar or identical to the example user interfaces of FIGS. 1-5. As described below, the example user interface 600 may include one or more headers capable of being updated based on a machine-learning model. In some examples, the example user interface 600 may include a navigation pane 602. As described above, the navigation pane 602 may present different data and/or options to a user. In some examples, the navigation pane 602 may include different graphical indicators which may be associated with a variety of virtual spaces, such as channels 604. The example user interface 600 may include any number of channels 604 which may be used to organize conversations between and amongst users according to topics. In some examples, the example user interface 600 may include channels 604 such as a general channel, a social channel, a help-tech channel 606 and/or any other channel. When a user selects a channel 604, a channel pane 608 may be presented. In some examples, the channel pane 608 can include access to content associated with the channel, in addition to enabling users to add other members, post content, and the like.

In some examples, the user interface 600 may include a canvas pane 610 that includes data associated with that of the help-tech channel 606. The canvas pane 610 may include various headers containing important information for the members of the help-tech channel 606. Such headers may include a summary header 612, a people header 614, a files header 616, and/or an editor experience header 618. In some examples, one or more user profiles may generate additional headers and/or modify the functionality of existing headers. That is, when generating a new header or modifying the functionality of one of the existing headers, the communication platform may cause a box 620 to be displayed to the user interface. In such cases, the box 620 may include various different fields. Such fields may include a header title, an AI (e.g., a manner in which to utilize machine-learning models), and/or a channel from which to retrieve data to input to the machine-learning models. As shown, the AI (or machine-learning model) box may indicate that the user profile is requesting that the machine-learning models associated with the header perform a summarizing operation. However, this is not intended to be limiting; in other examples, the AI box may include a different modifying operation. Further, the box 620 may indicate that the channel from which the content is to be retrieved is the help-tech channel 606. That is, when performing the summarizing operation, the communication platform may retrieve content from the help-tech channel 606. Accordingly, a first channel may have a first summary section and a second channel may have a second summary section. Based on the user profile specifying that the content to summarize is to be retrieved from the first channel and the second channel, respectively, the first summary section may include different content than the second summary section.

Figure 7:
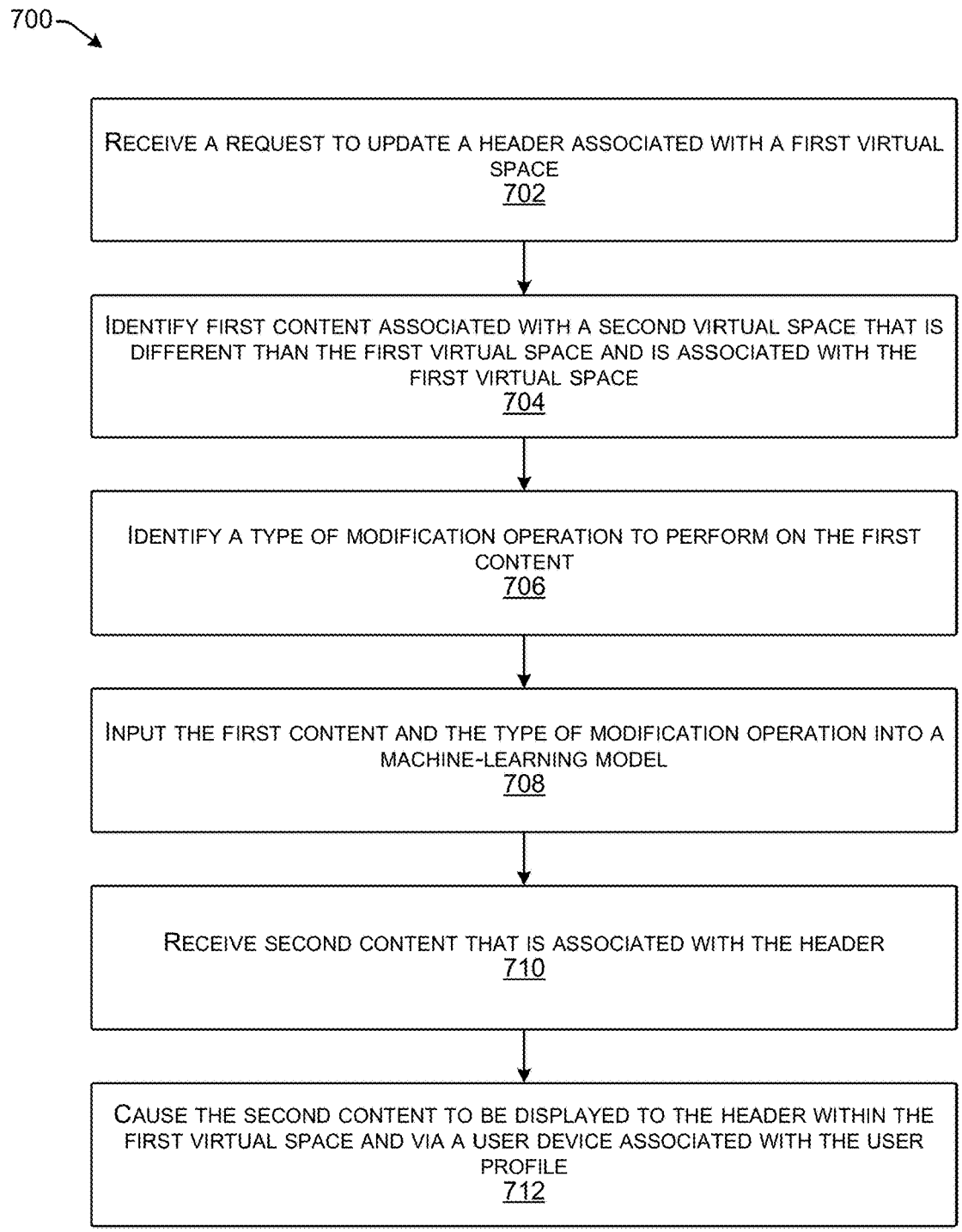
FIG. 7 is a flow diagram illustrating an example process for receiving a request to update a header, identifying a type of modification operation to perform based on the request, identifying data on which to perform the modification operation, generating content to associate with the header based on inputting the data and the type of modification operation into a machine-learning model.

FIG. 7 is a flow diagram illustrating an example process 700 for receiving a request to update a header, identifying a type of modification operation to perform based on the request, identifying data on which to perform the modification operation, generating content to associate with the header based on inputting the data and the type of modification operation into a machine-learning model. The processes illustrated in FIG. 7 is described with reference to components described above with reference to the example environment 100 shown in FIG. 1 for convenience and ease of understanding. However, the processes illustrated in FIG. 7 is not limited to being performed using the components described above with reference to the example environment 100. Moreover, the components described above with reference to the example environment 100 are not limited to performing the processes illustrated in FIG. 7.

Process 700 is illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operation 702, the process 700 can include receiving a request to update a header associated with a first virtual space. In some examples, the communication platform may receive a request instructing the communication platform to perform an operation. A request may include one or more instructions for the communication platform to perform a header modifying, updating, and/or generating operation on data (or content) stored or otherwise displayed within a virtual space. That is, the request may include instruction(s) to modify content stored or otherwise displayed within a canvas. A canvas may be associated with a separate virtual space (e.g., channel, direct messaging instance, board, etc.) and may be a location in which data of the virtual space may be organized and/or curated for members of the virtual space. For instance, a virtual space may be a channel and the channel may include a canvas section (or virtual space) configured to organize and present important information to members of the channel.

In some examples, the user profiles may send the request by interacting with one or more actionable user interface elements within the canvas. The canvas may include one or more headers that may be configured to organize data within the canvas. Such headers may include a summary header configured to summarize the purpose of the virtual space and/or summarize the recent events within the virtual space, a people header configured to identify user profiles that are sufficiently active within the virtual space, a document header configured to identify one or more documents or files that may be relevant or important to the virtual space, a policies header configured to display current policies associated with the members of the virtual space, etc. However, this is not intended to be limiting; in other examples, the canvas may include more or fewer headers configured to present information about the same or different topics. In some examples, the headers may include one or more actionable user interface elements enabling a user profile to request one or more header updating operations. For example, the user interface elements may include options to update one or more of the headers. As such, the user profile may select a specific header and instruct the communication platform to update the data stored or otherwise displayed therein.

At operation 704, the process 700 can include identifying first content associated with a second virtual space that is different than the first virtual space and is associated with the first virtual space. In some examples, upon receiving the request, the communication platform may identify data on which to perform the header modifying operation. Data may include message data, reaction data, file data, document data, administrative data, user data, email data, meeting data, and/or any other type of data that may be relevant to the header to modify. As such, the communication platform may identify the content within the virtual space that the user profile is requesting to modify. That is, if the user profile is requesting to update a summary header within a canvas, the communication platform may identify data within the channel with which the canvas is associated. In some examples, the data (or content) that the communication platform retrieves or otherwise identifies may differ based on the type of header modification operation. For instance, if the modifying operation is to summarize the channel (or virtual space), the communication platform may retrieve some or all message data and/or file data. If the modifying operation is to display highly active user profiles within the channel, the communication platform may retrieve administrative data (e.g., membership data, role data, etc.), message data (e.g., author data), file data (e.g., author data), and/or any other type of data. Such data may be relevant in determining which user profiles have been active and/or contributing to the channel. If the modifying operation is to display important documents within the channel, the communication platform may retrieve file data (e.g., number of times accessed, number of times modified, roles of the user profiles that access the file, frequency at which user profiles access the file, purpose of the file, etc.) and/or document data (e.g., number of times accessed, number of times modified, roles of the user profiles that access the file, frequency at which user profiles access the file, purpose of the file, etc.). In such cases, such data may be relevant in determining which files and/or documents are most relevant and/or important to the channel. Accordingly, the communication platform may identify, receive, or otherwise retrieve various types of data to utilize when performing the header updating operation.

At operation 706, the process 700 can include identifying a type of modification operation to perform on the first content. In some examples, the communication platform may identify the header modifying operation based on the request. Some or all headers of the canvas may include a unique modification operation. For example, such header modifying operations may include summarizing the content associated with a virtual space, identifying one or more user profiles that are sufficiently active (e.g., number of posts and/or interactions with the virtual space meet or exceed a threshold value, number of posts within a threshold period of time satisfies a threshold, etc.) in the virtual space, identifying one or more documents that are relevant (e.g., accessed, shared, or created within a threshold period of time, accessed and/or revised a threshold number of times, etc.) to the virtual space, converting a manual header (e.g., created and/or updated manually) of a canvas to a learned header updated based on a machine-learning model. However, this is not intended to be limiting; in other examples, the header modifying operations may include more or fewer operations configured to perform the same or different header modifying operations. As such, when receiving the request to modify the content within a header, the request may indicate which header to modify. In such instances, each header may be associated with a specific header updating operation. As such, based on identifying the header to modify, the communication platform may identify the modifying operation associated with the header. For example, a user profile may send a request to the communication platform to modify the summary header. As such, the request may include an instruction to modify the summary header. Further, the communication platform may determine that the summary header may be associated with a virtual space summarizing operation. However, this is not intended to be limiting; in other examples, the request may also include the modifying operation to perform on the header.

At operation 708, the process 700 can include inputting the first content and the type of modification operation into a machine-learning model. Based on identifying the data on which the header modifying operation is to be performed, the communication platform may perform the header modifying operation using a machine-learning model. The communication platform may include one or more machine-learning models trained to perform various header modifying operations. For instance, the communication platform may have one or more machine-learning models trained to perform some or all of the header modifying operations described above. As such, upon identifying the data to use in the header operation, the communication platform may provide the data as input into the machine-learning model(s) trained to output content consistent with the modifying operation specified by the user profile.

At operation 710, the process 700 can include receiving second content that is associated with the header. In such cases, the communication platform may receive content output from the machine-learning model. Such content may be representative of the type of modification operation. That is, the communication platform may receive data that corresponds to the type of data to display in the specific header.

At operation 712, the process 700 can include causing the second content to be displayed to the header within the first virtual space and via a user device associated with the user profile. The communication platform may display or otherwise render the canvas section of the virtual space of to one or more different locations within the communication platform. For instance, the communication platform may include a canvas section (or virtual space) included in a side pane and as such, the communication platform may associate the content with the canvas section. Accordingly, upon receiving a request (e.g., selection) from the user to access the virtual space canvas, the communication platform may cause the canvas section to be displayed which may include the content. In other examples, the communication platform may display the content in a thread pane in the communication platform. In yet other examples, the communication platform may display the content via a separate interface (or notification) such as an overlay interface, popup box, and/or any other type of interface. Alternatively or additionally, the displayed content may include an actionable user interface.

Example Clauses

A: A system comprising: one or more processors; and one or more non-transitory computer-readable media storing computer-executable instructions that, when executed, cause the one or more processors to perform operations comprising: receiving, via a first virtual space of a communication platform and from a user profile associated with a user of the communication platform, a request to update a header associated with the first virtual space; identifying, based on the request, first content associated with a second virtual space that is different than the first virtual space and that is associated with the first virtual space; identifying, based on the request, a type of modification operation to perform on the first content; inputting the first content and the type of modification operation into a machine-learning model trained to output second content consistent with the type of modification operation; receiving, from the machine-learning model, the second content that is associated with the header; and causing, in response to receiving the second content from the machine-learning model, the second content to be associated with the header and displayed within the first virtual space and via a user interface of a user device associated with the user profile.

B: The system of paragraph A, wherein the first content comprises at least one of: administrative data associated with the second virtual space, message data associated with the second virtual space, membership data of the second virtual space, temporal data associated with the first content, or file data, associated with the second virtual space.

C: The system of paragraph A, wherein the type of modification operation includes instructions to perform operations associated with at least one of: summarizing the first content, identifying, based on the first content, one or more users associated with the second virtual space, or identifying, based on the first content, one or more documents associated with the second virtual space.

D: The system of paragraph C, wherein identifying the one or more documents is based on at least one of: the one or more documents being shared, accessed, modified, or created within a threshold period of time, or the one or more documents being shared, accessed, modified, or created with a threshold frequency.

E: The system of paragraph C, wherein identifying the one or more users is based on at least one of: determining that the one or more users post a first threshold number of content to the second virtual space, determining that the one or more users posted third content to the second virtual space within a first threshold period of time, or determining that the one or more users post a second threshold number of content to the second virtual space within a second threshold period of time.

F: The system of paragraph A, the operations further comprising: determining that the request includes one or more instructions to convert the header from being manually updated to being updated using one or more machine-learning models; receiving, based on the request, user input data representing a second type of modification operation associated with the header; and generating, based on the one or more instructions and the second type of modification operation, the second content.

G: One or more non-transitory computer-readable media storing instructions executable by one or more processors, wherein the instructions, when executed, cause the one or more processors to perform operations comprising: receiving, via a first virtual space of a communication platform and from a user profile associated with a user of the communication platform, a request to update a header associated with the first virtual space; identifying, based at least in part on the request, first content associated with a second virtual space; identifying, based at least in part on the request, a type of modification operation to perform on the first content; inputting the first content and the type of modification operation into a machine-learning model trained to output second content consistent with the type of modification operation; receiving, from the machine-learning model, the second content that is associated with the header; and causing, in response to receiving the second content from the machine-learning model, the second content to be displayed to header within the first virtual space and via a user interface of a user device associated with the user profile.

H: The one or more non-transitory computer-readable media of paragraph G, wherein the first content comprises at least one of: administrative data associated with the second virtual space, message data associated with the second virtual space, membership data of the second virtual space, temporal data associated with the first content, or file data, associated with the second virtual space.

I: The one or more non-transitory computer-readable media of paragraph G, wherein the type of modification operation includes instructions to perform operations associated with at least one of: summarizing the first content, identifying, based at least in part on the first content, one or more users associated with the second virtual space, or identifying, based at least in part on the first content, one or more documents associated with the second virtual space.

J: The one or more non-transitory computer-readable media of paragraph I, wherein identifying the one or more documents is based at least in part on at least one of: the one or more documents being shared, accessed, modified, or created within a threshold period of time, or the one or more documents being shared, accessed, modified, or created with a threshold frequency.

K: The one or more non-transitory computer-readable media of paragraph I, wherein identifying the one or more users is based at least in part on at least one of: determining that the one or more users post a first threshold number of content to the second virtual space, determining that the one or more users posted third content to the second virtual space within a first threshold period of time, or determining that the one or more users post a second threshold number of content to the second virtual space within a second threshold period of time.

L: The one or more non-transitory computer-readable media of paragraph G, the operations further comprising: determining that the request includes one or more instructions to convert the header from being manually updated to being updated using one or more machine-learning models; receiving, based at least in part on the request, user input data representing a second type of modification operation associated with the header; and generating, based at least in part on the one or more instructions and the second type of modification operation, the second content.

M: The one or more non-transitory computer-readable media of paragraph G, wherein the second virtual space is different than the first virtual space and is associated with the first virtual space.

N: A method comprising: receiving, via a first virtual space of a communication platform and from a user profile associated with a user of the communication platform, a request to update a header associated with the first virtual space; identifying, based at least in part on the request, first content associated with a second virtual space; identifying, based at least in part on the request, a type of modification operation to perform on the first content; inputting the first content and the type of modification operation into a machine-learning model trained to output second content consistent with the type of modification operation; receiving, from the machine-learning model, the second content that is associated with the header; and causing, in response to receiving the second content from the machine-learning model, the second content to be displayed to header within the first virtual space and via a user interface of a user device associated with the user profile.

O: The method of paragraph N, wherein the first content comprises at least one of: administrative data associated with the second virtual space, message data associated with the second virtual space, membership data of the second virtual space, temporal data associated with the first content, or file data, associated with the second virtual space.

P: The method of paragraph N, wherein the type of modification operation includes instructions to perform operations associated with at least one of: summarizing the first content, identifying, based at least in part on the first content, one or more users associated with the second virtual space, or identifying, based at least in part on the first content, one or more documents associated with the second virtual space.

Q: The method of paragraph P, wherein identifying the one or more documents is based at least in part on at least one of: the one or more documents being shared, accessed, modified, or created within a threshold period of time, or the one or more documents being shared, accessed, modified, or created with a threshold frequency.

R: The method of paragraph P, wherein identifying the one or more users is based at least in part on at least one of: determining that the one or more users post a first threshold number of content to the second virtual space, determining that the one or more users posted third content to the second virtual space within a first threshold period of time, or determining that the one or more users post a second threshold number of content to the second virtual space within a second threshold period of time.

S: The method of paragraph N, the operations further comprising: determining that the request includes one or more instructions to convert the header from being manually updated to being updated using one or more machine-learning models; receiving, based at least in part on the request, user input data representing a second type of modification operation associated with the header; and generating, based at least in part on the one or more instructions and the second type of modification operation, the second content.

T: The method of paragraph N, wherein the second virtual space is different than the first virtual space and is associated with the first virtual space.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   one or more processors; and
   one or more non-transitory computer-readable media storing computer-executable instructions that, when executed, cause the one or more processors to perform operations comprising:
      receiving, via a first virtual space of a communication platform and from a user profile associated with a user of the communication platform, a request to update a header associated with the first virtual space;
      identifying, based on the request, first content associated with a second virtual space that is different than the first virtual space and that is associated with the first virtual space;
      identifying, based on the request, a type of modification operation to perform on the first content;
      inputting the first content and the type of modification operation into a machine-learning model trained to output second content consistent with the type of modification operation;
      receiving, from the machine-learning model, the second content that is associated with the header; and
      causing, in response to receiving the second content from the machine-learning model, the second content to be associated with the header and displayed within the first virtual space and via a user interface of a user device associated with the user profile.

2. The system of claim 1, wherein the first content comprises at least one of:
   administrative data associated with the second virtual space,
   message data associated with the second virtual space,
   membership data of the second virtual space,
   temporal data associated with the first content, or
   file data, associated with the second virtual space.

3. The system of claim 1, wherein the type of modification operation includes instructions to perform operations associated with at least one of:
   summarizing the first content,
   identifying, based on the first content, one or more users associated with the second virtual space, or
   identifying, based on the first content, one or more documents associated with the second virtual space.

4. The system of claim 3, wherein identifying the one or more documents is based on at least one of:
   the one or more documents being shared, accessed, modified, or created within a threshold period of time, or
   the one or more documents being shared, accessed, modified, or created with a threshold frequency.

5. The system of claim 3, wherein identifying the one or more users is based on at least one of:
   determining that the one or more users post a first threshold number of content to the second virtual space,
   determining that the one or more users posted third content to the second virtual space within a first threshold period of time, or
   determining that the one or more users post a second threshold number of content to the second virtual space within a second threshold period of time.

6. The system of claim 1, the operations further comprising:
   determining that the request includes one or more instructions to convert the header from being manually updated to being updated using one or more machine-learning models;
   receiving, based on the request, user input data representing a second type of modification operation associated with the header; and
   generating, based on the one or more instructions and the second type of modification operation, the second content.

7. One or more non-transitory computer-readable media storing instructions executable by one or more processors, wherein the instructions, when executed, cause the one or more processors to perform operations comprising:
   receiving, via a first virtual space of a communication platform and from a user profile associated with a user of the communication platform, a request to update a header associated with the first virtual space;
   identifying, based at least in part on the request, first content associated with a second virtual space;
   identifying, based at least in part on the request, a type of modification operation to perform on the first content;

inputting the first content and the type of modification operation into a machine-learning model trained to output second content consistent with the type of modification operation;

receiving, from the machine-learning model, the second content that is associated with the header; and causing, in response to receiving the second content from the machine-learning model, the second content to be displayed to header within the first virtual space and via a user interface of a user device associated with the user profile.

8. The one or more non-transitory computer-readable media of claim 7, wherein the first content comprises at least one of:

administrative data associated with the second virtual space, message data associated with the second virtual space, membership data of the second virtual space, temporal data associated with the first content, or file data, associated with the second virtual space.

9. The one or more non-transitory computer-readable media of claim 7, wherein the type of modification operation includes instructions to perform operations associated with at least one of:

summarizing the first content, identifying, based at least in part on the first content, one or more users associated with the second virtual space, or identifying, based at least in part on the first content, one or more documents associated with the second virtual space.

10. The one or more non-transitory computer-readable media of claim 9, wherein identifying the one or more documents is based at least in part on at least one of:

the one or more documents being shared, accessed, modified, or created within a threshold period of time, or the one or more documents being shared, accessed, modified, or created with a threshold frequency.

11. The one or more non-transitory computer-readable media of claim 9, wherein identifying the one or more users is based at least in part on at least one of:

determining that the one or more users post a first threshold number of content to the second virtual space, determining that the one or more users posted third content to the second virtual space within a first threshold period of time, or determining that the one or more users post a second threshold number of content to the second virtual space within a second threshold period of time.

12. The one or more non-transitory computer-readable media of claim 7, the operations further comprising:

determining that the request includes one or more instructions to convert the header from being manually updated to being updated using one or more machine-learning models;

receiving, based at least in part on the request, user input data representing a second type of modification operation associated with the header; and generating, based at least in part on the one or more instructions and the second type of modification operation, the second content.

13. The one or more non-transitory computer-readable media of claim 7, wherein the second virtual space is different than the first virtual space and is associated with the first virtual space.

14. A method comprising:

receiving, via a first virtual space of a communication platform and from a user profile associated with a user of the communication platform, a request to update a header associated with the first virtual space;

identifying, based at least in part on the request, first content associated with a second virtual space;

identifying, based at least in part on the request, a type of modification operation to perform on the first content;

inputting the first content and the type of modification operation into a machine-learning model trained to output second content consistent with the type of modification operation;

receiving, from the machine-learning model, the second content that is associated with the header; and causing, in response to receiving the second content from the machine-learning model, the second content to be displayed to header within the first virtual space and via a user interface of a user device associated with the user profile.

15. The method of claim 14, wherein the first content comprises at least one of:

administrative data associated with the second virtual space, message data associated with the second virtual space, membership data of the second virtual space, temporal data associated with the first content, or file data, associated with the second virtual space.

16. The method of claim 14, wherein the type of modification operation includes instructions to perform operations associated with at least one of:

summarizing the first content, identifying, based at least in part on the first content, one or more users associated with the second virtual space, or identifying, based at least in part on the first content, one or more documents associated with the second virtual space.

17. The method of claim 16, wherein identifying the one or more documents is based at least in part on at least one of:

the one or more documents being shared, accessed, modified, or created within a threshold period of time, or the one or more documents being shared, accessed, modified, or created with a threshold frequency.

18. The method of claim 16, wherein identifying the one or more users is based at least in part on at least one of:

determining that the one or more users post a first threshold number of content to the second virtual space, determining that the one or more users posted third content to the second virtual space within a first threshold period of time, or determining that the one or more users post a second threshold number of content to the second virtual space within a second threshold period of time.

19. The method of claim 14, the operations further comprising:

determining that the request includes one or more instructions to convert the header from being manually updated to being updated using one or more machine-learning models;

receiving, based at least in part on the request, user input data representing a second type of modification operation associated with the header; and generating, based at least in part on the one or more instructions and the second type of modification operation, the second content.

20. The method of claim 14, wherein the second virtual space is different than the first virtual space and is associated with the first virtual space.

\* \* \* \* \*